US012293873B2

United States Patent
Tomiyama et al.

(10) Patent No.: US 12,293,873 B2
(45) Date of Patent: May 6, 2025

(54) INPUT DEVICE

(71) Applicant: ALPS ALPINE CO., LTD., Tokyo (JP)

(72) Inventors: Tatsuhiro Tomiyama, Miyagi (JP); Kazunari Takahashi, Miyagi (JP); Yuki Ikezoe, Miyagi (JP); Takenori Takahashi, Miyagi (JP); Misuzu Suto, Miyagi (JP); Tomoya Endo, Miyagi (JP); Takeshi Shirasaka, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/432,409

(22) Filed: Feb. 5, 2024

(65) Prior Publication Data
US 2024/0177906 A1    May 30, 2024

Related U.S. Application Data

(63) Continuation of application No. PCT/JP2022/010994, filed on Mar. 11, 2022.

(30) Foreign Application Priority Data

Aug. 26, 2021 (JP) ................................. 2021-138379

(51) Int. Cl.
*H01F 7/20* (2006.01)
*H01F 7/02* (2006.01)

(52) U.S. Cl.
CPC ............... *H01F 7/20* (2013.01); *H01F 7/02* (2013.01)

(58) Field of Classification Search
CPC ..................................... H01F 7/02; H01F 7/20
See application file for complete search history.

(56) References Cited

U.S. PATENT DOCUMENTS

| 2016/0172136 A1 | 6/2016 | McGaffey et al. |
| 2016/0217953 A1 | 7/2016 | Ely et al. |

(Continued)

FOREIGN PATENT DOCUMENTS

| JP | 2005-100179 | 4/2005 |
| JP | 2016-134135 | 7/2016 |

(Continued)

OTHER PUBLICATIONS

International Search Report for PCT/JP2022/010994 mailed on May 24, 2022.

*Primary Examiner* — Randell J Krug
(74) *Attorney, Agent, or Firm* — IPUSA, PLLC

(57) ABSTRACT

An input device which is capable of imparting a magnetic operational reaction force, includes a stationary member, a magnetic member fixed to the stationary member, a movable member at least partially housed in the stationary member to which the magnetic member is fixed, and a driving device including a magnet fixed to the movable member and coils fixed to the stationary member, configured to move the movable member in a first direction relative to the stationary member, wherein the magnet is magnetized along a second direction perpendicular to the first direction, wherein the coils have bundles of turns constituted by conductive wires, and the conductive wires in the bundles of turns extend along a third direction perpendicular to each of the first direction and the second direction, and the conducting wires are juxtaposed along the first direction.

6 Claims, 21 Drawing Sheets

(56) References Cited

U.S. PATENT DOCUMENTS

2017/0076885 A1    3/2017   Stryker
2019/0147712 A1    5/2019   Szeto et al.

FOREIGN PATENT DOCUMENTS

| JP | 2019-527879 | 10/2019 | |
|---|---|---|---|
| JP | 2020-086649 | 6/2020 | |
| WO | 2018/151031 | 8/2018 | |
| WO | WO-2019151232 A1 * | 8/2019 | ............. H02K 33/16 |

* cited by examiner

INPUT DEVICE

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2022/010994 filed on Mar. 11, 2022 and designating the U.S., which claims priority to Japanese Patent Application No. 2021-138379 filed on Aug. 26, 2021. The entire contents of the foregoing applications are incorporated herein by reference.

BACKGROUND OF THE INVENTION

1. Field of the Invention

The present invention relates to an input device capable of imparting a magnetic operational reaction force.

2. Description of the Related Art

Conventionally, there is known an input device provided with a force sensitivity generator having a cylindrical movable part which can be depressed by an operator, a coil spring which can push up the depressed movable part, a cylindrical guide member which guides the movable part so that the movable part can move up and down, and a coil wound around the guide member (see Patent Document 1).

In this force sensing generator, the cylindrical movable part is composed of a permanent magnet which is bipolarly magnetized in the up-and-down direction. The coil generates a magnetic field when receiving a current supply. The coil spring is compressed to generate a restoring force when the movable part moves downward.

The force sensing generator can switch between magnetic attraction and repulsion acting between the coils and the movable part (permanent magnet) by switching the direction of current flowing through the coils, and can move the movable part up and down using the magnetic attraction or repulsion. The force sensing generator is configured to generate force by the restoring force by the coil spring and the magnetic attraction or repulsion between the coils and the permanent magnet.

PRIOR-ART DOCUMENTS

Patent Documents

[Patent Document 1] International Patent Publication No. 2018/151031

SUMMARY OF THE INVENTION

However, since the force sensing generator described above cannot generate a magnetic force when a current is not supplied to the coil, in which the force sensing generator is not energized, the force sensing generator cannot generate a magnetic operational reaction force.

Therefore, it is desirable to provide an input device capable of generating a magnetic operational reaction force even when the input device is not energized.

The present invention provides an input device which is capable of imparting a magnetic operational reaction force. The input device includes stationary member, a magnetic member fixed to the stationary member, a movable member at least partially housed in the stationary member to which the magnetic member is fixed, and a driving device including a magnet fixed to the movable member and coils fixed to the stationary member, configured to move the movable member in a first direction relative to the stationary member, wherein the magnet is magnetized along a second direction perpendicular to the first direction, wherein the coils have bundles of turns of constituted by conductive wires, and the conductive wires in the bundles of turns extend along a third direction perpendicular to each of the first direction and the second direction, and the conducting wires are juxtaposed along the first direction, and wherein the magnetic member is positioned so as to generate an attraction force between the magnet and the magnetic member which acts to bring the movable member closer to a predetermined position from a position deviated from the predetermined position.

The above-described input device can generate a magnetic operational reaction force even when the input device is not energized.

DESCRIPTION OF THE PREFERRED EMBODIMENTS

Figure 1:
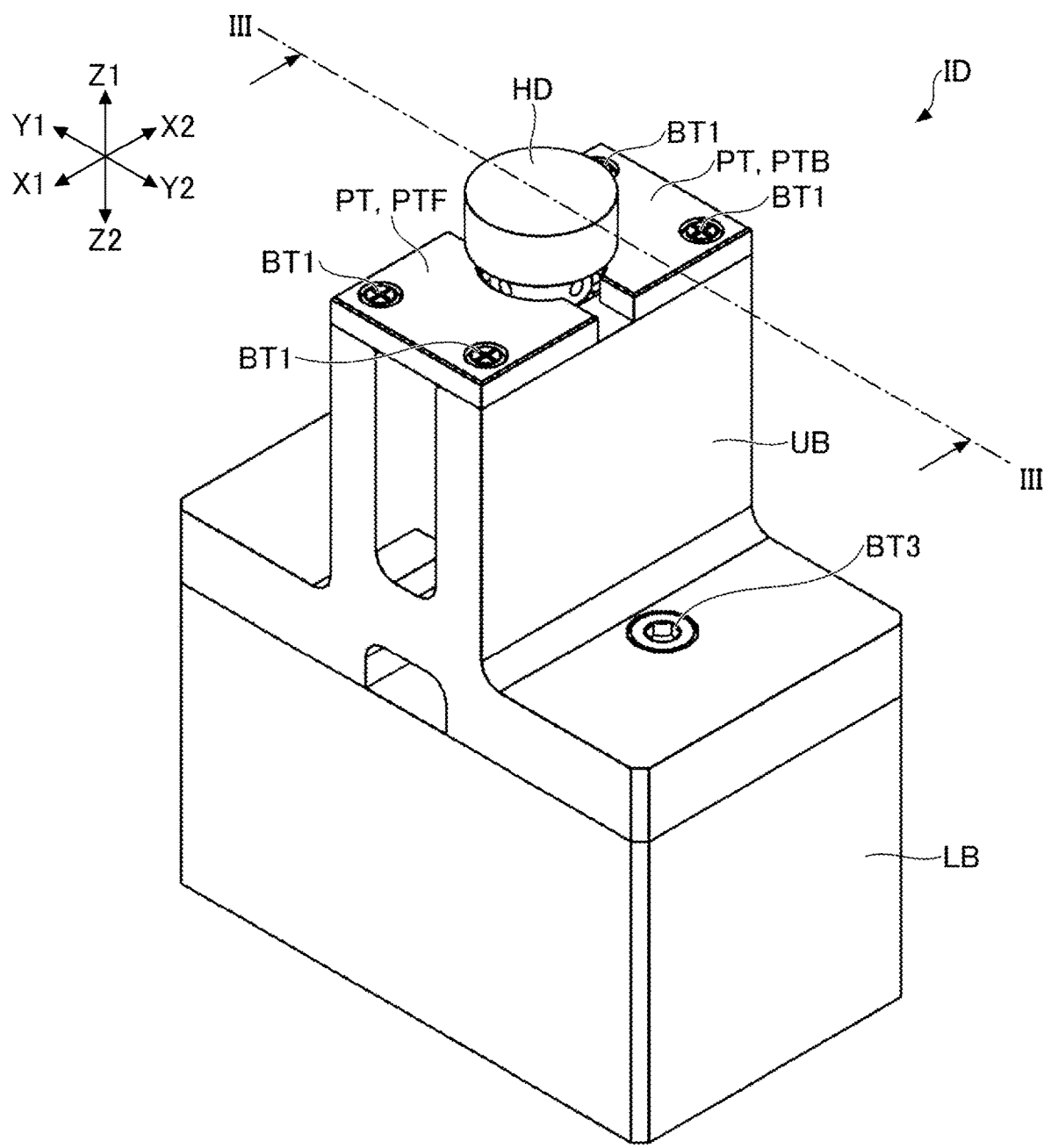
FIG. 1 is a perspective view of an input device.
Figure 2:
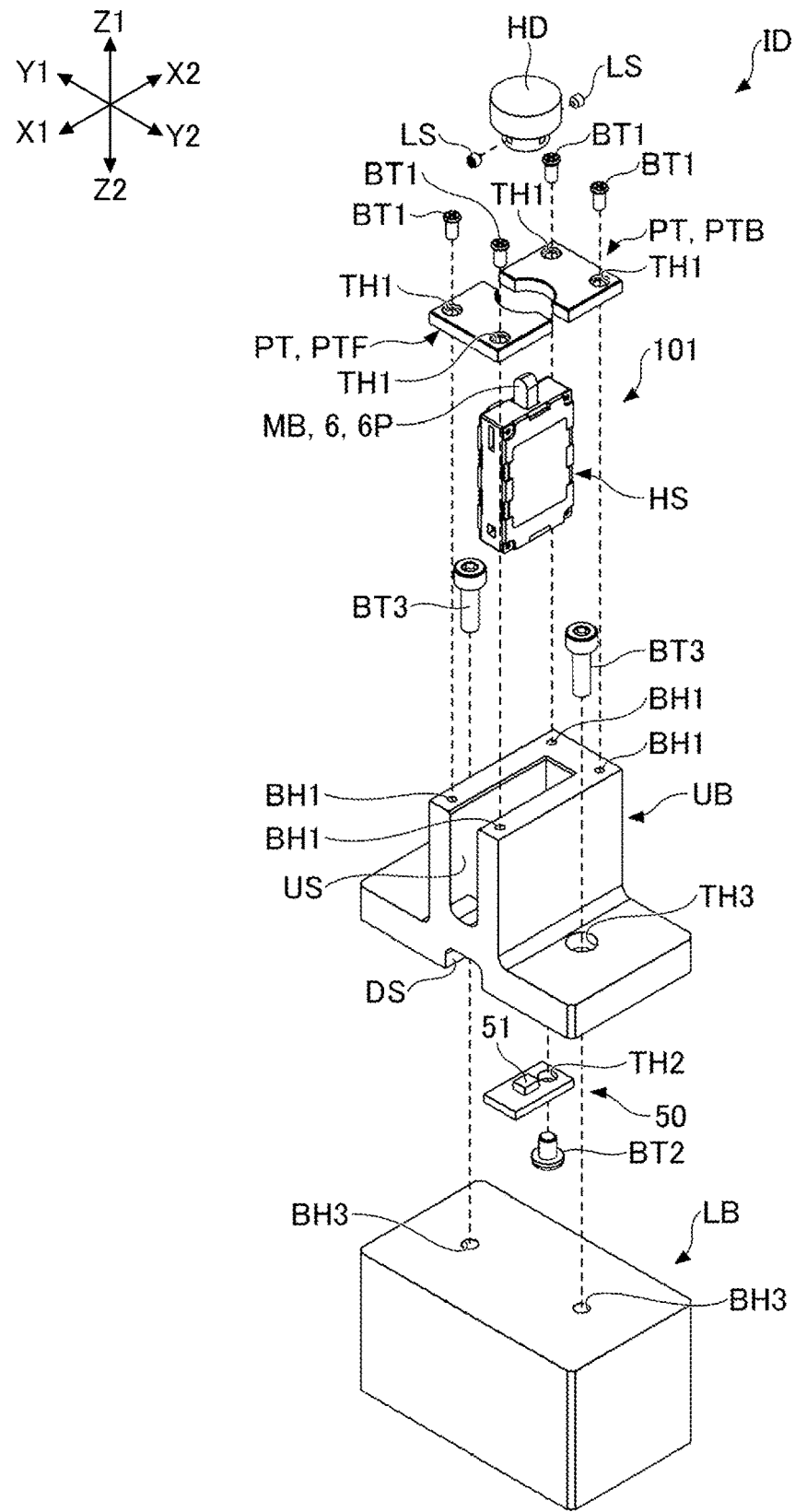
FIG. 2 is an exploded perspective view of the input device.
Figure 3:
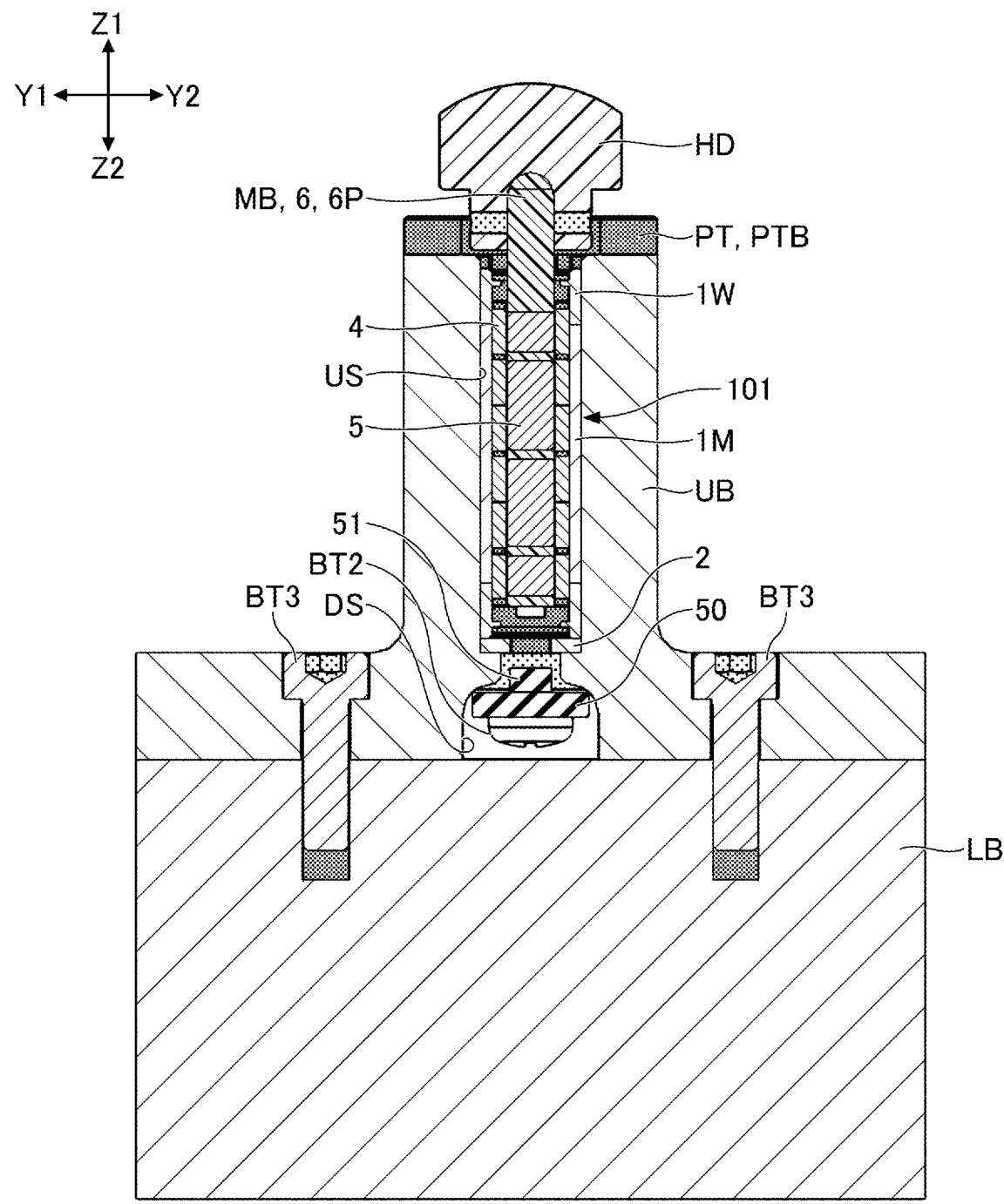
FIG. 3 is a cross-sectional view of the input device.

Hereinafter, an input device ID according to an embodiment of the present invention will be described with reference to the drawings. FIG. 1 is a perspective view of the input device ID, and FIG. 2 is an exploded perspective view of the input device ID. FIG. 3 is a cross-sectional view of the input device ID. Specifically, FIG. 3 is the cross-sectional view of the input device ID in a plane parallel to the YZ plane including the cut line (dash-dotted line III-III) illustrated in FIG. 1 when viewed from the X1 side.

In each of FIGS. 1, 2, and 3, X1 represents one direction in the X-axis constituting the three-dimensional rectangular coordinate system, and X2 represents the other direction in the X-axis. Y1 represents one direction in the Y-axis constituting the three-dimensional rectangular coordinate system, and Y2 represents the other direction in the Y-axis. Similarly, Z1 represents one direction in the Z-axis constituting the three-dimensional rectangular coordinate system, and Z2 represents the other direction in the Z-axis. In this embodiment, the X1 side of the input device ID corresponds to the front side of the input device ID, and the X2 side of the input device ID corresponds to the rear side of the input device ID. The Y1 side of the input device ID corresponds to the left side of the input device ID, and the Y2 side of the input device ID corresponds to the right side of the input device ID. The Z1 side of the input device ID corresponds to the position above the input device ID, and the Z2 side of the input device ID corresponds to the lower side of the input device ID. The same applies in other drawings.

The input device ID is configured so that a magnetic operational reaction force can be applied. In the illustrated examples, the input device ID is a push-pull switch that responds to each of the push and pull operations and mainly includes a head member HD, a lid member PT, a linear motion device 101, a circuit board 50, a position sensor 51, an upper block member UB, and a lower block member LB. The input device ID may be a push switch that responds only to the push operation or a pull switch that responds only to the pull operation.

The head member HD is a member that can be pushed and pulled by an operator. In the illustrated example, the head member HD is a metal knob formed in a two-stage cylindrical shape so that the operator can grip the head member HD and push and pull the head member HD along the operation direction (Z-axis direction), and is fastened to the movable member MB (a shaft portion 6P of a magnet holder 6) of the linear motion device 101 by a pair of set screws LS. However, the head member HD may be formed of a synthetic resin. The lid member PT covers the upper surface of the upper block member UB. In the illustrated example, the lid member PT is a plate-like member formed of metal and includes a front side lid member PTF and a rear side lid member PTB. However, the lid member PT may be formed of another material such as a synthetic resin or the like. The front cover member PTF and the rear cover member PTB have the same shape and size. The cover member PT is fastened to the upper surface of the upper block member UB by first bolts BT1 as fastening members. Specifically, the first bolts BT1 are inserted into the first through-holes TH1 formed in the cover member PT and are screwed into the first bolt holes BH1 formed on the upper surface of the upper block member UB.

The linear motion device 101 is an example of a magnetic operational reaction force imparting device, and is configured to impart a reaction force (magnetic operational reaction force) to the head member HD relative to the force (operation force) exerted by the operator on the head member HD. In the illustrated example, the linear motion device 101 includes a stationary member (housing HS) and a movable member MB (magnet holder 6), and is configured to impart a magnetic operational reaction force to the head member HD by moving the magnet holder 6 up and down using a driving means DM (a driving device) (see FIG. 5). The housing HS is fitted into and fixed to an upper recess US formed in the central portion of the upper block member UB. The lid member PT is fastened to the upper surface of the upper block member UB in such a state that the lower surface thereof is in contact with the upper surface of the housing HS. The lid member PT is fastened to the upper surface of the upper block member UB so as to form a cylindrical space between the front side lid member PTF and the rear side lid member PTB that can accommodate the lower cylindrical portion of the head member HD.

The circuit board 50 is a circuit board to which the position sensor 51 is attached. In the illustrated example, the circuit board 50 is a rigid substrate with an insulator as the base material, and is fastened to the upper block member UB by a second bolt BT2 as a fastening member. Specifically, the second bolt BT2 is inserted into the second through-hole TH2 formed in the circuit board 50 and is screwed into the second bolt hole (not viewable in FIGS. 1 to 3) formed on the ceiling surface of a lower recess DS of the upper block member UB.

The position sensor 51 is configured to detect the position of the movable member MB constituting the linear motion device 101. In the illustrated example, the position sensor 51 is configured to detect the position (height) of the movable member MB in the Z-axis direction by detecting the magnetic field generated by the magnet 5 (see FIG. 5) held by the magnet holder 6 constituting the movable member MB. Specifically, the position sensor 51 is constituted by a Giant Magneto Resistive effect (GMR) element and is configured to measure a voltage value that varies according to the magnitude of the magnetic field generated by the magnet 5 received by the position sensor 51 and to detect the position of the movable member MB to which the magnet 5 is attached. For example, the position sensor 51 is configured to output a voltage value that is larger as the N-polar portion of the magnet 5 approaches. However, the position sensor 51 may be configured to output a voltage value that is larger as the S-polar portion of the magnet 5 approaches, a voltage value that is smaller as the N-polar portion of the magnet 5 approaches, or a voltage value that is smaller as the S-polar portion of the magnet 5 approaches. The position sensor 51 may be configured to detect a position of a lens holder 3 using other magnetoresistive elements such as a semiconductor magneto resistive (SMR) element, an anisotropic magneto resistive (AMR) element, a tunnel magneto resistive (TMR) element, and the like. Alternatively, the position sensor 51 may be configured to detect the position of the lens holder 3 using a Hall element or the like. The position sensor 51 may be configured to detect the position of the movable member MB using ultrasonic waves, infrared rays, laser beams, or the like.

The upper block member UB is configured to hold the linear motion device 101 and the position sensor 51 at a desired position. The lower block member LB is configured to hold the upper block member UB at a desired position. In the illustrated example, both the upper block member UB and the lower block member LB are formed of metal. However, at least one of the upper block member UB and the lower block member LB may be formed of another material such as a synthetic resin or the like. Specifically, the upper block member UB is fastened to the lower block member LB by third bolts BT3 as fastening members. More specifically, the third bolts BT3 are inserted into third through-holes TH3 formed in the upper block member UB and screwed into third bolt holes BH3 formed on the upper surface of the lower block member LB.

The input device ID may be configured to determine whether a push operation or a pull operation has been performed based on the output of the position sensor 51. Alternatively, the input device ID may be configured to derive a depressing amount or a pulling amount of the movable member MB based on the output of the position sensor 51. Alternatively, the input device ID may include a contact point that comes into contact with the movable member MB and becomes conductive when the movable member MB is depressed downward (in the Z2 direction) by a predetermined distance, or a contact point that comes into contact with the movable member MB and becomes conductive when the movable member MB is pulled upward (in the Z1 direction) by a predetermined distance.

Figure 4A:
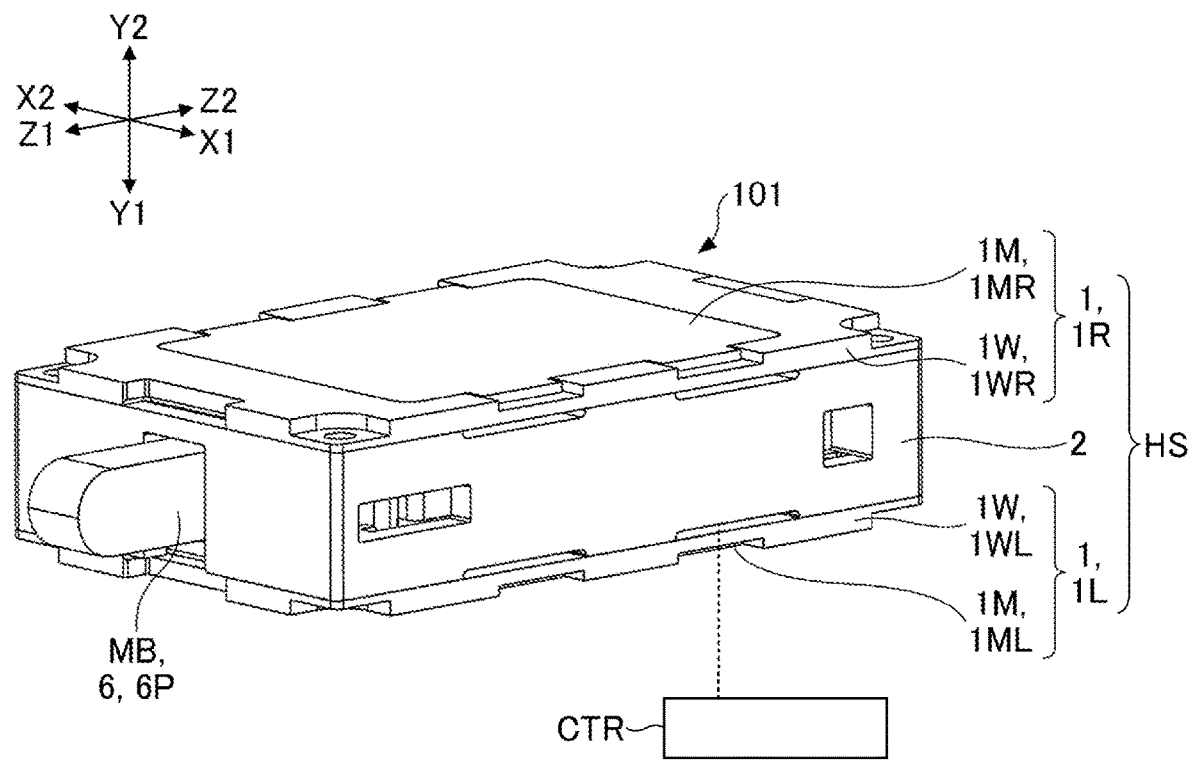
FIG. 4A is a perspective view of a linear motion device.
Figure 4B:
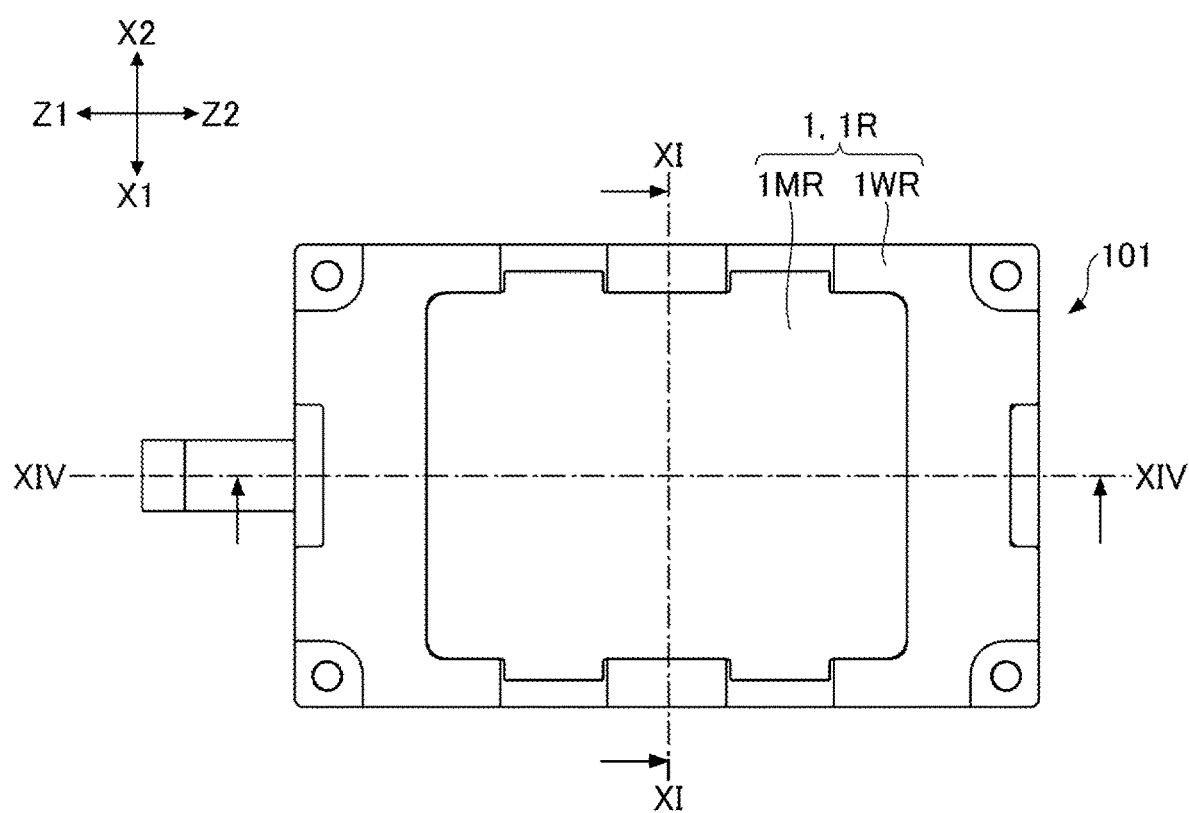
FIG. 4B is a right-side view of the linear motion device.
Figure 5:
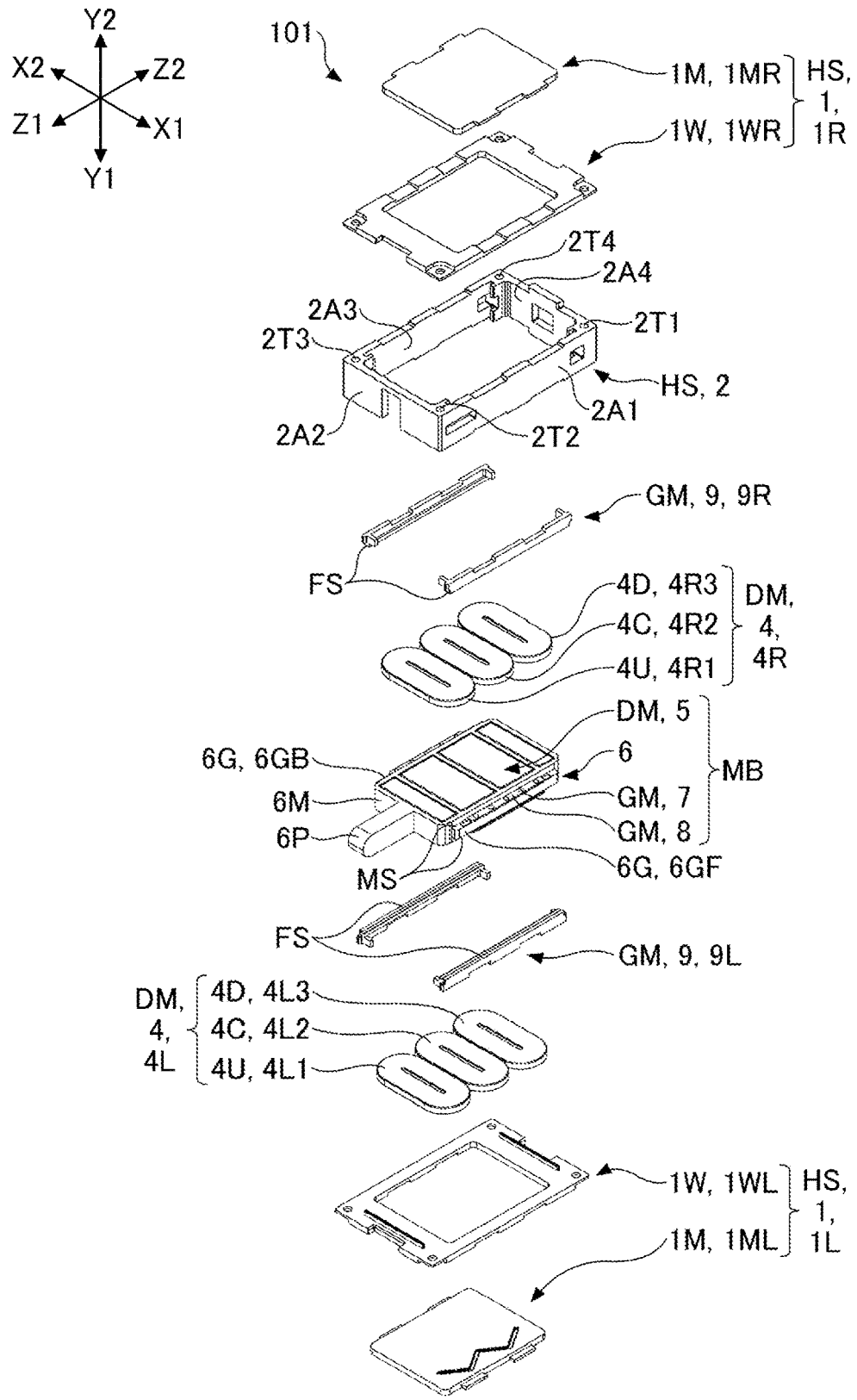
FIG. 5 is an exploded perspective view of the linear motion device.

Referring now to FIGS. 4A, 4B, and 5, the linear motion device 101 will be described. FIG. 4A is a perspective view of the linear motion device 101, and FIG. 4B is a right-side view of the linear motion device 101. FIG. 5 is an exploded perspective view of the linear motion device 101.

The linear motion device 101 has the housing HS as a stationary member, the movable member MB housed in the housing HS, and a coil 4 attached to the housing HS. A control unit CTR is connected to an input terminal provided on an insulating substrate (not illustrated) fixed to the housing HS. The input terminal is connected to the coil 4 via a conductor pattern formed on the insulating substrate. The dashed line in FIG. 4A schematically illustrates that the control unit CTR and the input terminal provided on the insulating substrate are electrically connected.

As illustrated in FIG. 4A, the housing HS has an outline of a substantially rectangular parallelepiped, and the area of the plane parallel to the XZ plane (the left-side and the right-side) is widest. In this embodiment, the housing HS is composed of a cover 1 and a cylindrical body 2.

As illustrated in FIG. 5, the cover 1 includes a right cover 1R forming a right-side surface of the housing HS and a left cover 1L forming a left-side surface of the housing HS. Both the right cover 1R and the left cover 1L are flat plate members. In this embodiment, the right cover 1R and the left cover 1L have the same shape and size. That is, the right cover 1R and the left cover 1L are configured as the same parts.

Further, the right cover 1R is formed so as to be symmetrical in the front-and-back and symmetrical in the up-and-down. The same applies to the left cover 1L. The right cover 1R and the left cover 1L are arranged so as to be symmetrical to each other in the left-and-right.

Specifically, the right cover 1R includes a right magnetic member 1MR and a right frame 1WR. Similarly, the left cover 1L includes a left magnetic member 1ML and a left frame 1WL. Hereinafter, the right magnetic member 1MR and the left magnetic member 1ML are also referred to as a magnetic member 1M, and the right frame 1WR and the left frame 1WL are also referred to as a frame 1W.

The magnetic member 1M is arranged so as to magnetically attract the magnet 5 away from the magnet 5. In this embodiment, the magnetic member 1M is fixed to the frame 1W so as not to contact the magnet 5 constituting the movable member MB and so as to magnetically hold the magnet 5 in a predetermined position. When the magnet 5 is displaced from the predetermined position, the attraction force between the magnet 5 and the magnetic member 1M based on the magnetic force generated by the magnet 5 acts to pull the magnet 5 back to the predetermined position. The predetermined position is, for example, the position of the magnet 5 when the movable member MB is positioned at the center of the movable range.

The frame 1W is a non-magnetic member for supporting the magnetic member 1M. In this embodiment, the frame 1W is formed of austenitic stainless steel. However, the frame 1W may be formed of a synthetic resin. The magnetic member 1M is bonded to the frame 1W by an adhesive.

The cylindrical body 2 is formed to configure a part of the housing HS. In this embodiment, the cylindrical body 2 is a non-magnetic member and is formed of austenitic stainless steel. However, the cylindrical body 2 may be formed of a synthetic resin. Specifically, the cylindrical body 2 includes four plate portions 2A formed in a flat plate shape. More specifically, as illustrated in FIG. 5, the plate portions 2A include a first plate portion 2A1 and a third plate portion 2A3 which are opposite each other, and include a second plate portion 2A2 and a fourth plate portion 2A4 which are opposite each other and perpendicular to both the first plate portion 2A1 and the third plate portion 2A3.

The cover 1 is fastened to the cylindrical body 2 by fastening members (not illustrated). In this embodiment, the fastening members are male screws that can be operated by a Phillips screwdriver and are configured to engage with the female screw holes 2T formed at the four corners of the cylindrical body 2. The female screw holes 2T formed at the four corners of the cylindrical body 2 are formed to penetrate the corners of the cylindrical body 2 along the Y-axis direction, and include a first female screw hole 2T1 to a fourth female screw hole 2T4. The right cover 1R (right frame 1WR) is fastened to the right end of the cylindrical body 2 by four fastening members. Similarly, the left cover 1L (left frame 1WL) is fastened to the left end of the cylindrical body 2 by four fastening members.

The coil 4 is a member constituting the driving means DM. In this embodiment, the coil 4 is a winding coil formed by winding a conductive wire whose surface is covered with an insulating material, and is fixed to the cover 1. For clarity, FIG. 5 omits the detailed winding of the conducting wires. The same applies to other figures illustrating the coil 4. The coil 4 may be a laminated coil, a thin film coil, or the like. Specifically, the coil 4 includes a right coil 4R fixed to the left (Y1 side) surface of the right cover 1R (right magnetic member 1MR), and a left coil 4L fixed to the right (Y2 side) surface of the left cover 1L (left magnetic member 1ML). The right coil 4R includes a first right coil 4R1, a second right coil 4R2, and a third right coil 4R3 being juxtaposed and connected in series along the Z-axis direction, and the left coil 4L includes a first left coil 4L1, a second left coil 4L2, and a third left coil 4L3 being juxtaposed and connected in series along the Z-axis direction. Hereinafter, the first right coil 4R1 and the first left coil 4L1 are also referred to as the right coil 4R, the second right coil 4R2 and the second left coil 4L2 are also referred to as a center coil 4C, and the third right coil 4R3 and the third left coil 4L3 are also referred to as a lower coil 4D.

The control unit CTR is configured to control the movement of the movable member MB. In this embodiment, the control unit CTR is a device including an electronic circuit and a nonvolatile storage device, and is configured to control the direction and magnitude of the current flowing through the coil 4. The control unit CTR may be configured to control the direction and magnitude of the current flowing through the coil 4 in response to a control command from an external device such as a computer, or may be configured to control the direction and magnitude of the current flowing through the coil 4 without receiving a control command from the external device. In the present embodiment, the control unit CTR is provided outside the input device ID, but may be provided in the input device ID or may be provided inside the input device ID. The control unit CTR may be provided outside the housing HS or may be provided inside the housing HS.

Figure 6:
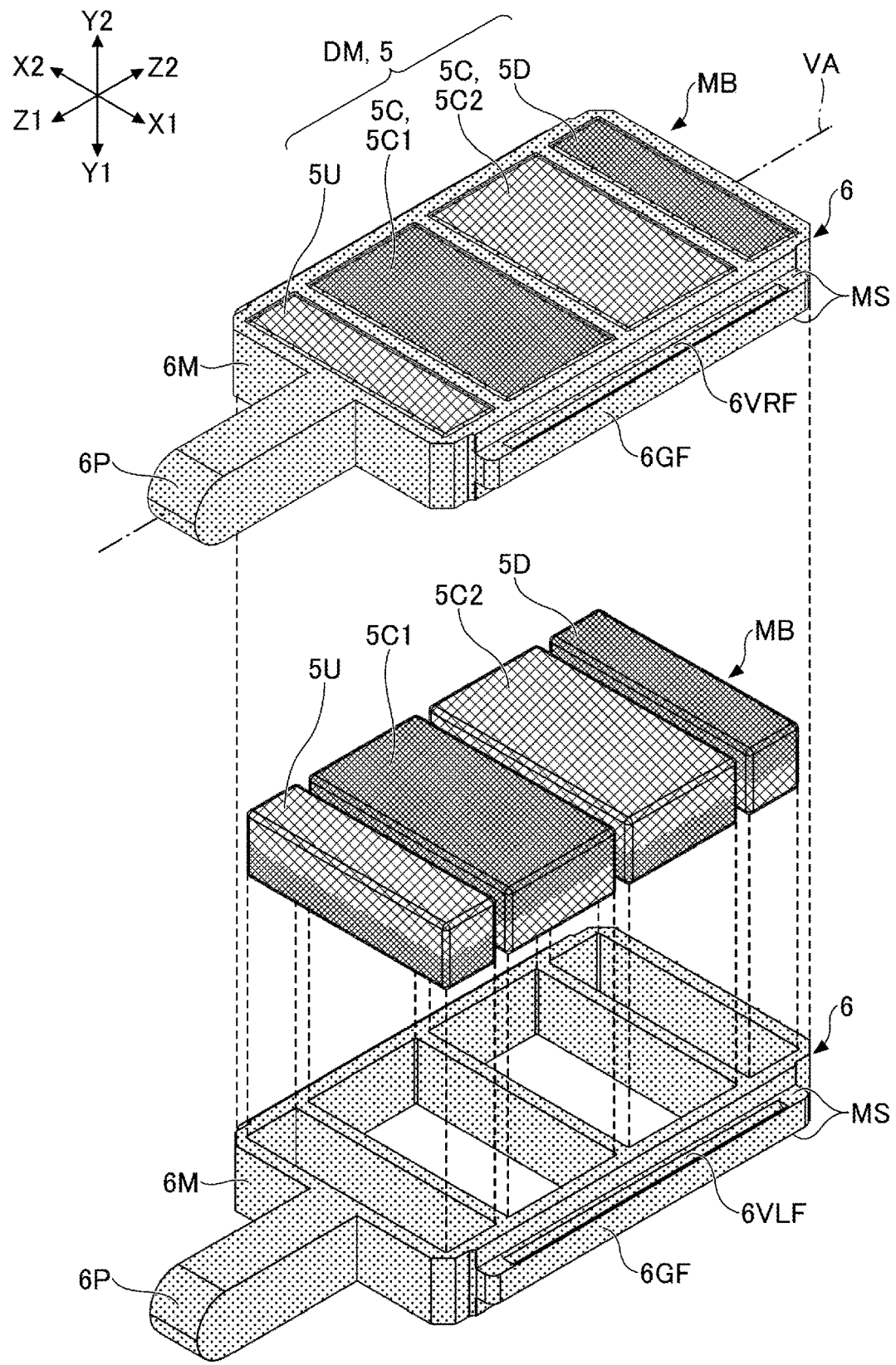
FIG. 6 is a perspective view of the movable member.
Figure 7:
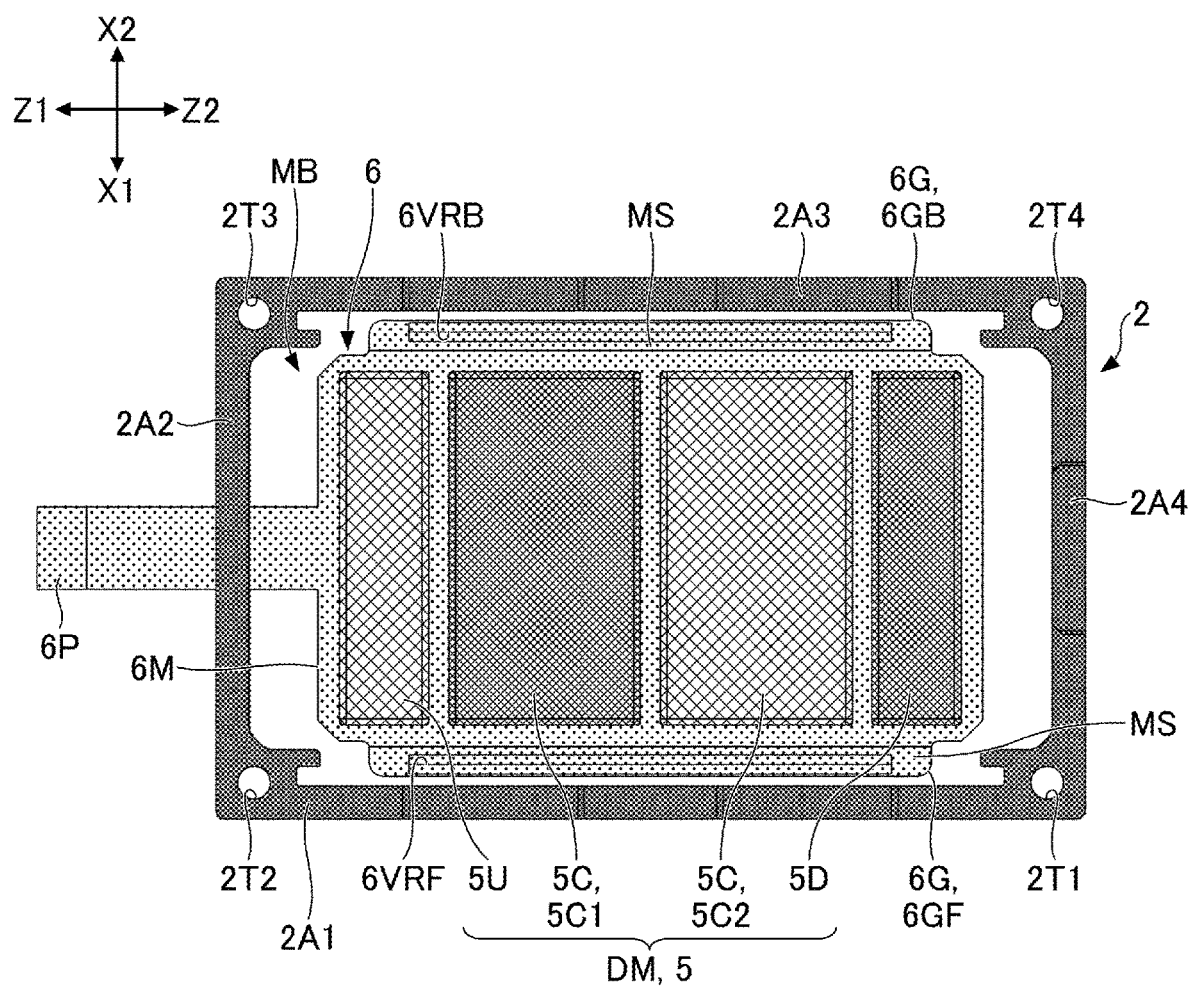
FIG. 7 is a right-side view of the movable member housed in a cylindrical body.

Next, the details of the movable member MB will be described with reference to FIGS. 6 and 7. FIGS. 6 and 7 are external views of the movable member MB. Specifically, the upper figure of FIG. 6 is an overall perspective view of the movable member MB, and the lower figure of FIG. 6 is an exploded perspective view of the movable member MB. FIG. 7 is a right-side view of the movable member MB housed in the cylindrical body 2.

The movable member MB includes the magnet 5 and the magnet holder 6. Specifically, the movable member MB is configured to move with respect to the housing HS (cylindrical body 2) along an axis VA (the upper figure of FIG. 6) extending in a predetermined direction (Z-axis direction).

The magnet 5 is a member constituting the driving means DM and is configured to generate magnetic flux. In this embodiment, the magnet 5 is a combination of a plurality of permanent magnets and includes an upper magnet 5U, a central magnet 5C, and a lower magnet 5D. The central magnet 5C includes a first central magnet 5C1 and a second central magnet 5C2. The upper magnet 5U, the first central magnet 5C1, the second central magnet 5C2, and the lower magnet 5D are permanent magnets that are magnetized to two poles along the Y-axis direction and are being juxtaposed along the Z-axis direction. In FIG. 6, for clarity, the upper magnet 5U, the first central magnet 5C1, the second central magnet 5C2, and the lower magnet 5D each have a coarse cross pattern provided to the N-pole portion and a fine cross pattern provided to the S-pole portion. The same applies to other figures illustrating the N-pole portion and the S-pole portion of the magnet 5 separately.

The magnet holder 6 is configured to hold the magnet 5. In this embodiment, the magnet holder 6 is a rectangular frame-shaped member formed of a non-magnetic member and has a main body part 6M and a protruding part 6G. The protruding part 6G is integrally formed so as to protrude from the main body part 6M in a front-and-back direction (X-axis direction). Specifically, the protruding part 6G includes a rear side protruding part 6GB protruding in the rear (X2 direction) and a front side protruding part 6GF protruding in the front (X1 direction). Specifically, the magnet holder 6 is configured to hold the upper magnet 5U, the first central magnet 5C1, the second central magnet 5C2, and the lower magnet 5D at approximately equal intervals along the Z-axis direction.

The driving means DM is an example of a driving force generating part, and is configured to move the movable member MB along the axis VA relative to the stationary member. In the present embodiment, the driving means DM is configured by the coil 4 and the magnet 5, and is configured to move the movable member MB (the magnet 5) along the axis VA by using Lorentz force corresponding to the direction and magnitude of the current supplied to the coil 4 through the control unit CTR.

Figure 8:
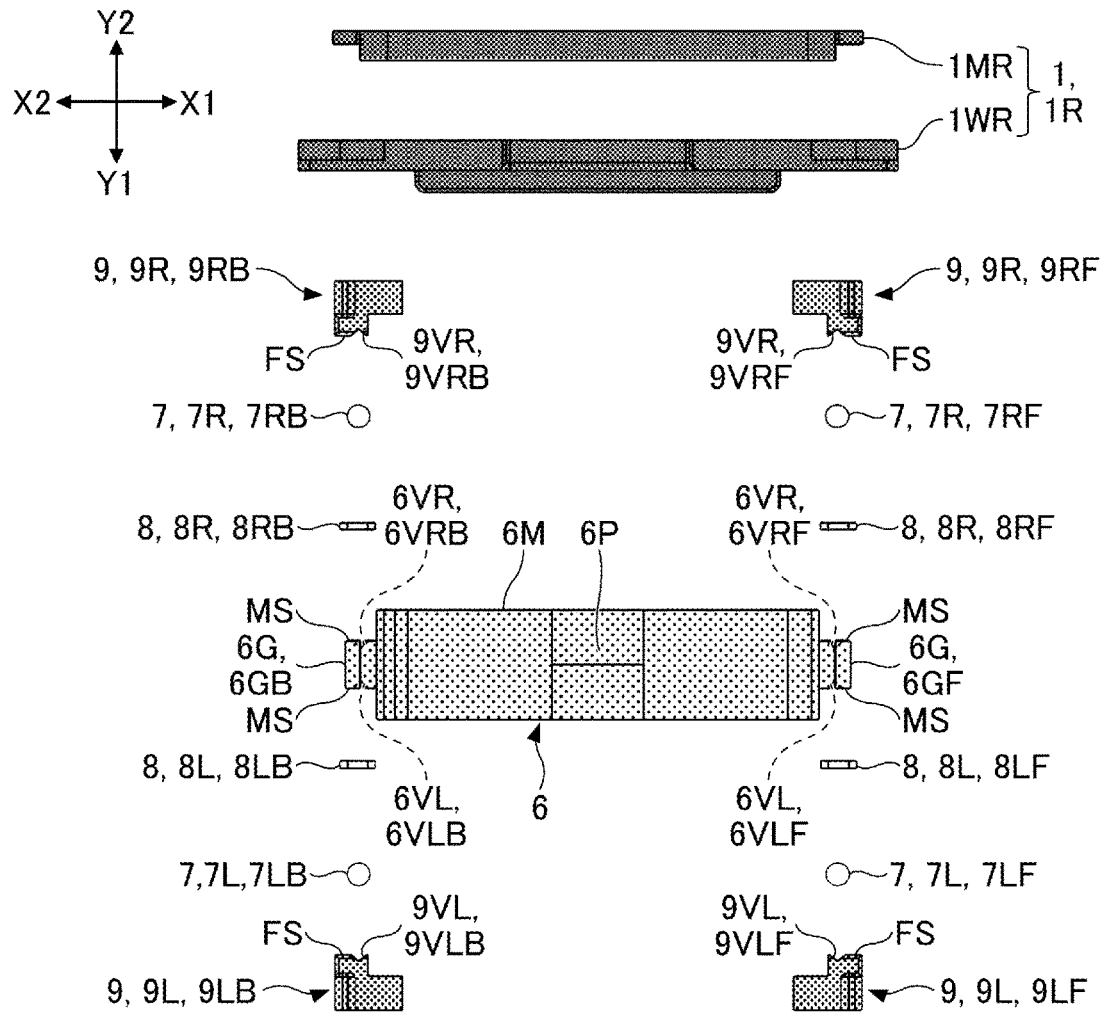
FIG. 8 is an exploded view of the linear motion device.

Next, a guide means GM (a guide device) will be described with reference to FIG. 8. FIG. 8 is an exploded view of the linear motion device 101. In FIG. 8, the members other than the cover 1, the magnet holder 6, a ball set 7, a ball guide 8, and a rail 9 are not illustrated for clarity. Specifically, the upper figure of FIG. 8 (the figure located above the block arrow) is a top view of the cover 1, the magnet holder 6, the ball set 7, the ball guide 8, and the rail 9 in the disassembled state. The lower figure of FIG. 8 (the figure located below the block arrow) is a top view of the cover 1, the magnet holder 6, the ball set 7, the ball guide 8, and the rail 9 in the assembled state. In FIG. 8, a fine dot pattern is provided to the right cover 1R and the left cover 1L, a coarse dot pattern is provided to the rail 9, and a coarser dot pattern is provided to the magnet holder 6 for clarity.

The guide means GM is configured to guide the movable member MB movably along the up-and-down direction (Z-axis direction) in the housing HS. In the present embodiment, the guide means GM includes the ball set 7, the ball guide 8, and the rail 9, as illustrated in FIG. 5. The guide means GM is configured such that the protruding part 6G formed on the magnet holder 6 constituting the movable member MB is sandwiched between a pair of rails 9 arranged on the left and right sides via the ball set 7, and is guided movably in the Z-axis direction by the pair of rails 9.

Specifically, the protruding part 6G formed on the magnet holder 6 includes a front protruding part 6GF extending in the Z-axis direction opposite the first plate portion 2A1 of the cylindrical body 2, and a rear protruding part 6GB extending in the Z-axis direction opposite the third plate portion 2A3 of the cylindrical body 2. The dimension M1 of the protruding part 6G (rear protruding part 6GB) in the left-and-right direction (Y-axis direction) is smaller than the dimension M2 of the main body part 6M in the left-and-right direction (Y-axis direction).

The rail 9 is a part of the stationary member and includes, as illustrated in FIG. 8, a right rail 9R arranged between the right cover 1R and the protruding part 6G, and a left rail 9L arranged between the left cover 1L and the protruding part 6G. The right rail 9R includes a right front rail 9RF extending in the Z-axis direction opposite the first plate portion 2A1 of the cylindrical body 2, and a right rear rail 9RB extending in the Z-axis direction opposite the third plate portion 2A3 of the cylindrical body 2. Similarly, the left rail 9L includes a left front rail 9LF extending in the Z-axis direction opposite the first plate portion 2A1 of the cylindrical body 2, and a left rear rail 9LB extending in the Z-axis direction opposite the third plate portion 2A3 of the cylindrical body 2.

The ball set 7 is an example of a rolling member and includes a plurality of balls. Specifically, the ball set 7 includes a right ball set 7R arranged between the right rail 9R and the protruding part 6G, and a left ball set 7L arranged between the left rail 9L and the protruding part 6G, as illustrated in the upper figure of FIG. 8. The right ball set 7R includes a right front ball set 7RF arranged between the right front rail 9RF and the front protruding part 6GF, and a right rear ball set 7RB arranged between the right rear rail 9RB and the rear protruding part 6GB. Similarly, the left ball set 7L includes a left front ball set 7LF arranged between the left front rail 9LF and the front protruding part 6GF, and a left rear ball set 7LB arranged between the left rear rail 9LB and the rear protruding part 6GB.

The ball guide 8 is a member for maintaining a space between the plurality of balls constituting the ball set 7. The ball guide 8 may be omitted. The ball guide 8 includes a right ball guide 8R for maintaining a space between the plurality of balls constituting the right ball set 7R, and a left ball guide 8L for maintaining a space between the plurality of balls constituting the left ball set 7L. The right ball guide 8R includes a right front ball guide 8RF for maintaining a space between the plurality of balls constituting the right front ball set 7RF, and a right rear ball guide 8RB for maintaining a space between the plurality of balls constituting the right rear ball set 7RB. Similarly, the left ball guide 8L includes a left front ball guide 8LF for maintaining a space between the plurality of balls constituting the left front ball set 7LF, and a left rear ball guide 8LB for maintaining a space between the plurality of balls constituting the left rear ball set 7LB.

Figure 9:
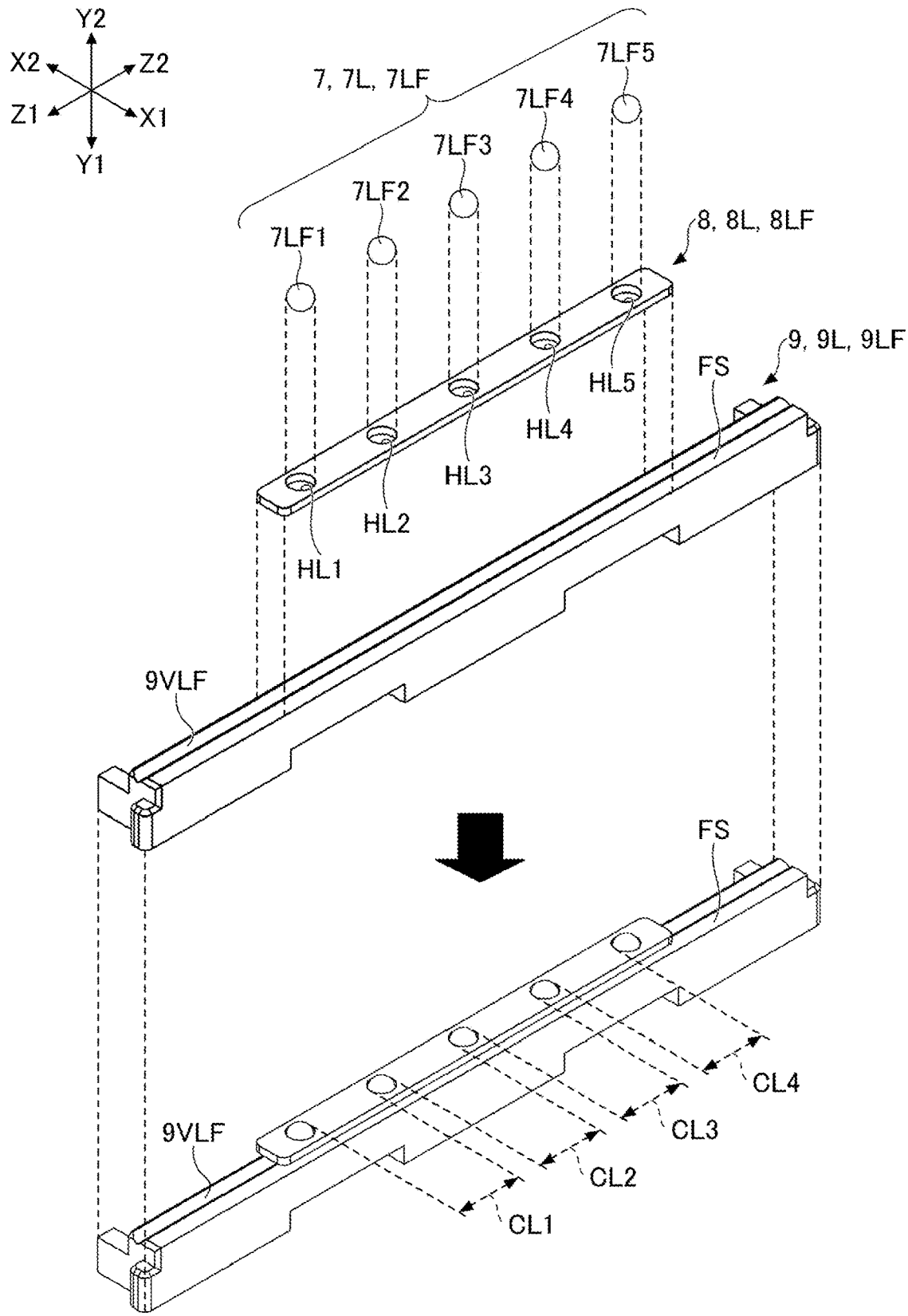
FIG. 9 is a perspective view of a left front ball set, a left front ball guide, and a left front rail.
Figure 10:
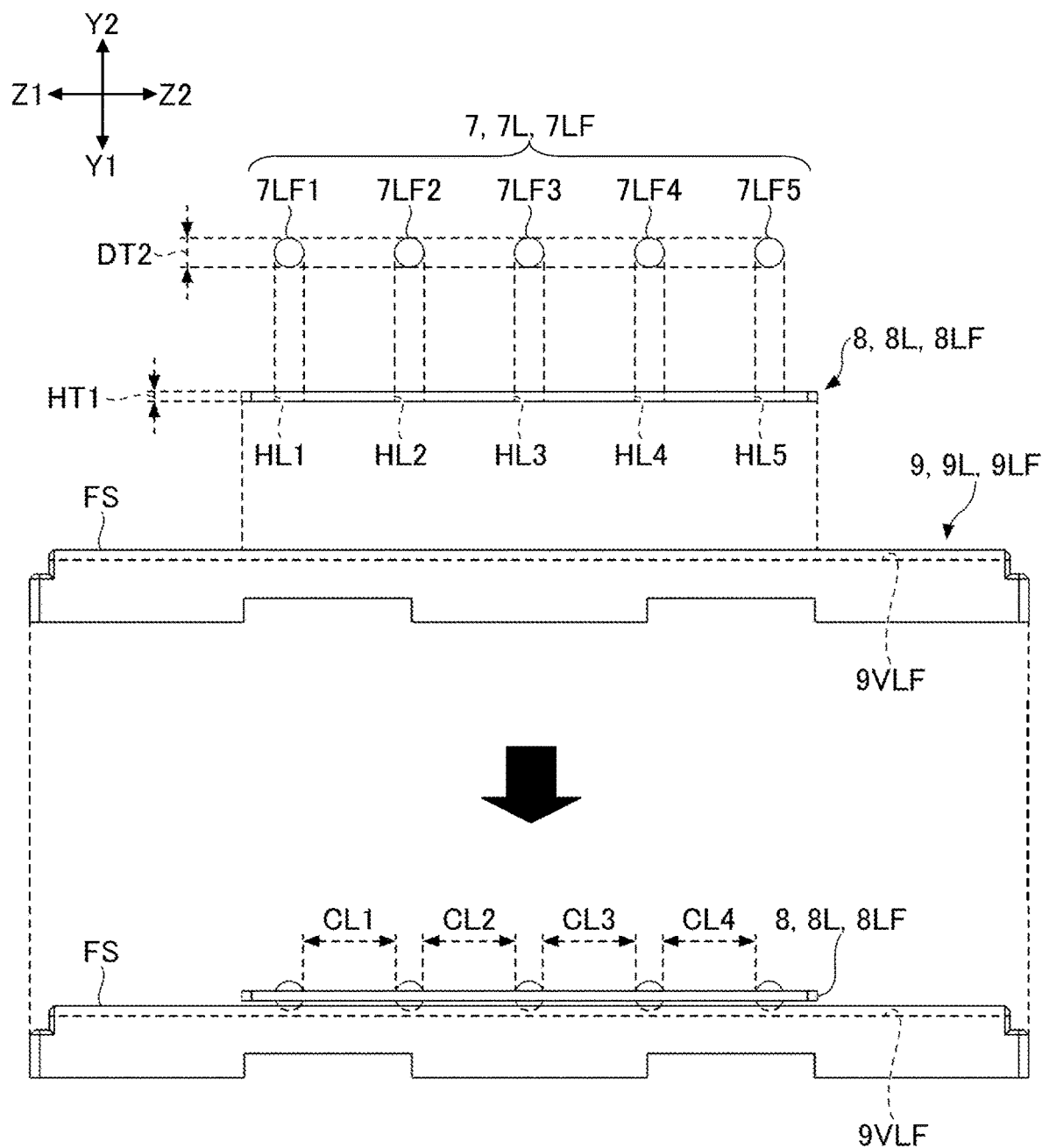
FIG. 10 is a front view of the left front ball set, the left front ball guide, and the left front rail.
Figure 11:
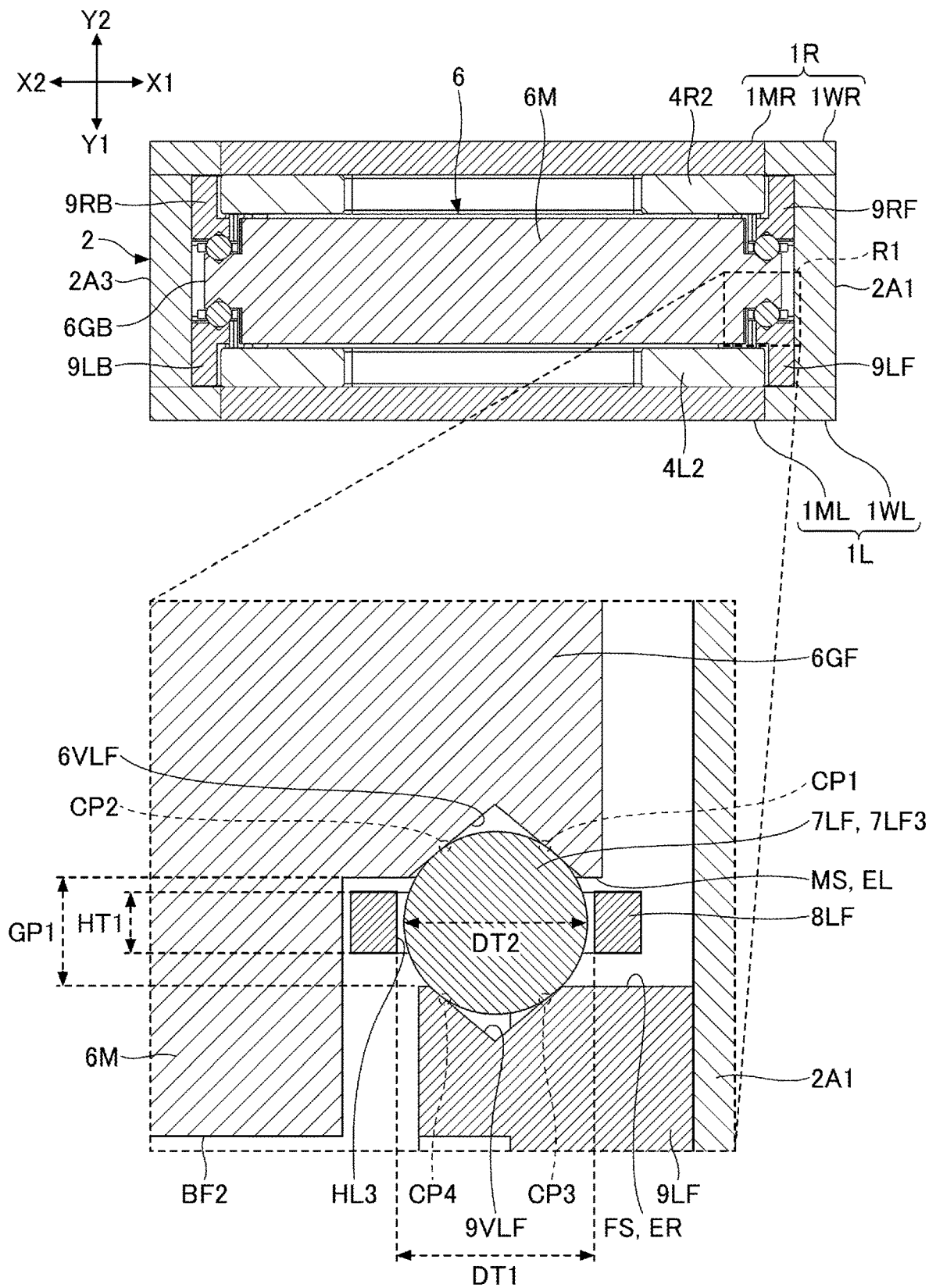
FIG. 11 is a cross-sectional view of the linear motion device.

The relationship between the ball set 7, the ball guide 8, and the rail 9 will now be described with reference to FIGS. 9 to 11. FIG. 9 is a perspective view of the left front ball set 7LF, the left front ball guide 8LF, and the left front rail 9LF. Specifically, the upper figure of FIG. 9 (the figure located above the block arrow) is an exploded perspective view of the left front ball set 7LF, the left front ball guide 8LF, and the left front rail 9LF, and the lower figure of FIG. 9 (the figure located below the block arrow) is an assembled perspective view of the left front ball set 7LF, the left front ball guide 8LF, and the left front rail 9LF. FIG. 10 is a front view of the left front ball set 7LF, the left front ball guide 8LF, and the left front rail 9LF. Specifically, the upper figure of FIG. 10 (located above the block arrow) is an exploded front view of the left front ball set 7LF, the left front ball guide 8LF, and the left front rail 9LF, and the lower figure of FIG. 10 (located below the block arrow) is an assembled front view of the left front ball set 7LF, the left front ball guide 8LF, and the left front rail 9LF. FIG. 11 is a cross-sectional view of the linear motion device 101. Specifically, the upper figure of FIG. 11 is a cross-sectional view of the linear motion device 101 in a plane parallel to the XZ plane including the dashed line XI-XI illustrated in FIG. 4B when viewed from the Z1 side as indicated by an arrow. The lower figure of FIG. 11 is an enlarged view of the area R1 surrounded by a dash-dotted line in the upper figure of FIG. 11. The following description with reference to FIGS. 9 to 11 relates to the positional relationship between the left front ball set 7LF, the left front ball guide 8LF, and the left front rail 9LF, but it also applies to the positional relationship between the right front ball set 7RF, the right front ball guide 8RF, and the right front rail 9RF, the positional relationship between the right rear ball set 7RB, the right rear ball guide 8RB, and the right rear rail 9RB, and the positional relationship between the left rear ball set 7LB, the left rear ball guide 8LB, and the left rear rail 9LB.

Specifically, the left front ball set 7LF includes five balls (first ball 7LF1 to fifth ball 7LF5), as illustrated in FIGS. 9 and 10. The five balls (first ball 7LF1 to fifth ball 7LF5) are arranged in five through-holes (first through-hole HL1 to fifth through-hole HL5) formed in the left front ball guide 8LF.

The five balls (first ball 7LF1 to fifth ball 7LF5) are arranged between a V-groove 6VLF (see FIG. 8) formed on the left end surface of the front protruding part 6GF of the magnet holder 6 and a V-groove 9VLF formed on the right end surface of the left front rail 9LF. In this case, a left end surface EL of the front protruding part 6GF functions as a movable end surface MS, and a right end surface ER of the left front rail 9LF functions as a fixed end surface FS.

As illustrated in FIGS. 10 and 11, the left front ball guide 8LF is configured such that a thickness HT1 in the Y-axis direction is smaller than the respective diameters DT2 of the first ball 7LF1 to the fifth ball 7LF5. Specifically, the thickness HT1 of the left front ball guide 8LF is configured to be smaller than a clearance GP1 between the left end surface EL of the front protruding part 6GF and the right end surface ER of the left front rail 9LF when the left front ball set 7LF is sandwiched between the left end surface EL of the front protruding part 6GF and the right end surface ER of the left front rail 9LF, as illustrated in the figure below in FIG. 11. The diameters DT1 of each of the five through-holes (first through-hole HL1 to fifth through-hole HL5) are configured to be slightly larger than the diameters DT2 of each of the five balls (first ball 7LF1 to fifth ball 7LF5), as illustrated in the figure below in FIG. 11. However, the diameters DT1 of each of the five through-holes (first through-hole HL1 to fifth through-hole HL5) may be configured to be slightly smaller than the diameters DT2 of each of the five balls (first ball 7LF1 to fifth ball 7LF5).

Each ball constituting the left front ball set 7LF is sandwiched between the V-groove 6VLF and the V-groove 9VLF so as to be in contact with the V-groove 6VLF at two contact points and to be in contact with the V-groove 9VLF at two contact points, as illustrated below in FIG. 11. The figure illustrated below in FIG. 11 illustrates a state in which the third ball 7LF3 is in contact with the V-groove 6VLF at the contact points CP1 and CP2, and in contact with the V-groove 9VLF at the contact points CP3 and CP4.

Further, in the illustrated example, the five through-holes (first through-holes HL1 to fifth through-holes HL5) of the left front ball guide 8LF are formed at intervals so that two adjacent balls of the five balls (first ball 7LF1 to fifth ball 7LF5) constituting the left front ball set 7LF are equally spaced. Specifically, as illustrated in FIGS. 9 and 10, the left front ball guide 8LF is formed so that the intervals CL1 between the first through-hole HL1 and the second through-hole HL2, the intervals CL2 between the second through-hole HL2 and the third through-hole HL3, the intervals CL3 between the third through-hole HL3 and the fourth through-hole HL4, and the intervals CL4 between the fourth through-hole HL4 and the fifth through-hole HL5 are all equal.

Figure 12:
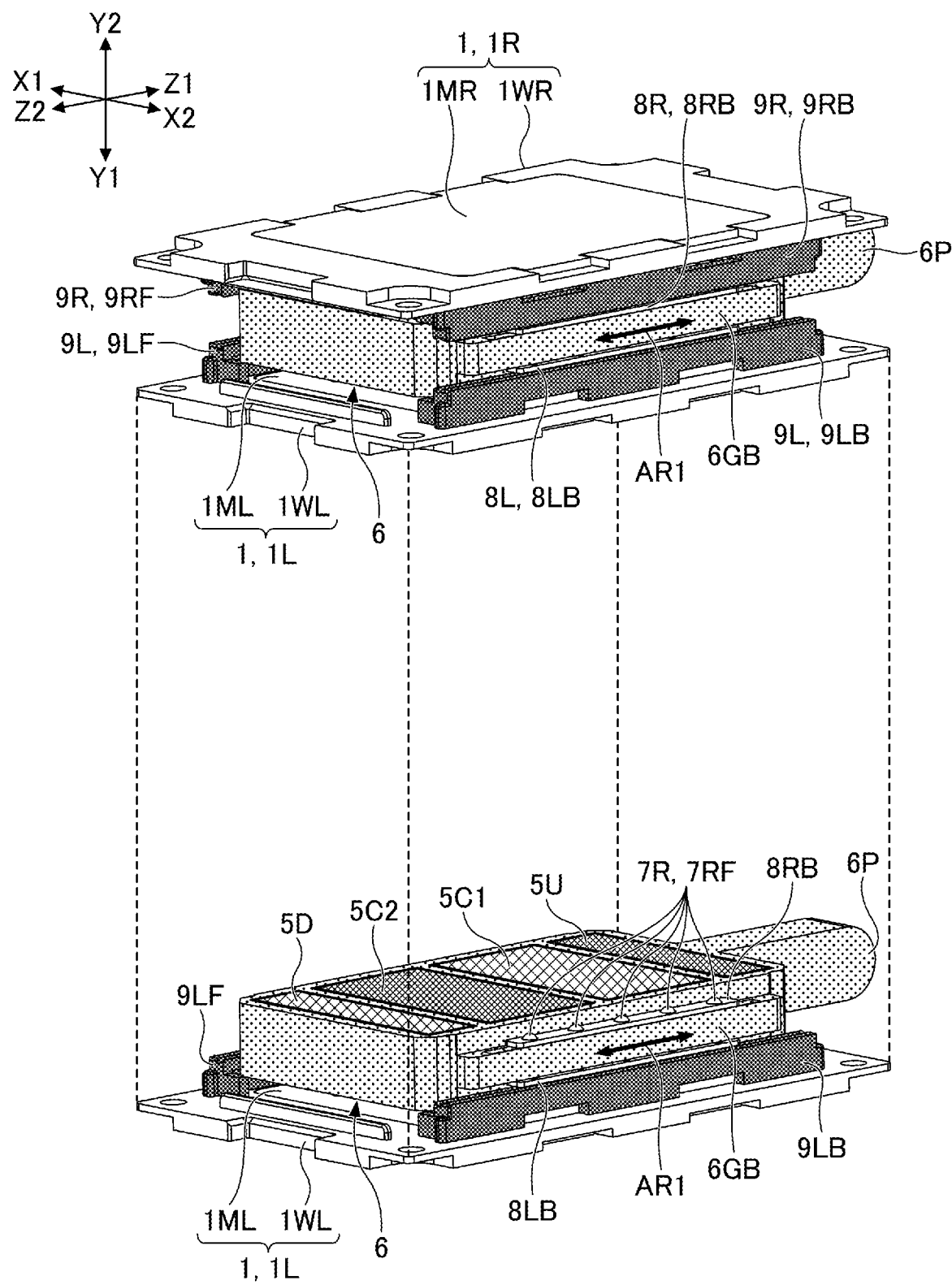
FIG. 12 is a perspective view of the linear motion device.

Next, the details of the guide means GM will be described with reference to FIG. 12. FIG. 12 is a perspective view of the linear motion device 101. In FIG. 12, members other than the cover 1, magnet 5, magnet holder 6, ball set 7, ball guide 8, and rail 9 are not illustrated for clarity. Specifically, the upper figure of FIG. 12 is a perspective view of the cover 1, magnet 5, magnet holder 6, ball set 7, ball guide 8, and rail 9 in an assembled state. The lower figure of FIG. 12 is a perspective view of the left cover 1L, magnet 5, magnet holder 6, ball set 7, left ball guide 8L, and left rail 9L in the assembled state. In FIG. 12, a coarse dot pattern is provided to the magnet holder 6 and a fine dot pattern is provided to the rail 9 for clarity.

As illustrated in FIG. 8, a tip (left end) of the right front rail 9RF and a tip (right end) of the left front rail 9LF are assembled so as to face each other across the front protruding part 6GF, and a tip (left end) of the right rear rail 9RB and a tip (right end) of the left rear rail 9LB are assembled so as to face each other across the rear protruding part 6GB, as illustrated in FIG. 8.

Specifically, as illustrated in the upper figure of FIG. 12, the tip of the right rear rail 9RB is arranged so as to face the right end surface of the rear protruding part 6GB with a small space therebetween, and the tip of the left rear rail 9LB is arranged so as to face the left end surface of the rear protruding part 6GB with a small space therebetween. That is, the rear protruding part 6GB is configured so as to have a shape substantially similar to the space formed between the tip of the right rear rail 9RB and the tip of the left rear rail 9LB. Specifically, the rear protruding part 6GB is formed as one substantially rectangular parallelepiped protrusion that extends continuously over most of the longitudinal length of the magnet holder 6. However, the rear protruding part 6GB may be an assembly of a plurality of protrusions disposed intermittently along the front-and-back direction of the magnet holder 6. The same applies to the front protruding part 6GF. In the illustrated example, the magnet holder 6 is formed so as to be symmetrical in front and rear. That is, the front protruding part 6GF and the rear protruding part 6GB are formed to have the same shape and size. However, the front protruding part 6GF and the rear protruding part 6GB may have different shapes.

As described above, the protruding part 6G can be moved in the direction indicated by the bidirectional arrow AR1 in FIG. 12 between the right rail 9R and the left rail 9L. Specifically, the protruding part 6G is configured so that the right ball set 7R is sandwiched between the V-groove 6VR (V-groove 6VRB and V-groove 6VRF in FIG. 8) formed on its right end surface that serves as the movable end surface MS and the V-groove 9VL (V-groove 9VRB and V-groove 9VRF in FIG. 8) formed on the front end surface (left end surface) of the right rail 9R that serves as the fixed end surface FS. The protruding part 6G is configured so that the left ball set 7L is sandwiched between the V-groove 6VL (V-groove 6VLB and V-groove 6VLF in FIG. 8) formed on its left end surface that serves as the movable end surface MS and the V-groove 9VL (V-groove 9VLB and V-groove 9VLF in FIG. 8) formed on the front end surface (right end surface) of the left rail 9L that serves as the fixed end surface FS. The protruding part 6G is configured to allow the right ball set 7R to roll between the V-groove 6VR and the V-groove 9VR and the left side ball set 7L to roll between the V-groove 6VL and the V-groove 9VL, while moving in the up-and-down direction (Z-axis direction).

With this configuration, the movement of the magnet holder 6 in the front-and-back direction (X-axis direction) and the left-and-right direction (Y-axis direction) is restricted, while smooth movement in the up-and-down direction (Z-axis direction) is permitted.

However, the protruding part 6G of the magnet holder 6 may be configured to be in direct contact with the rail 9 and to slide on the rail 9. In this case, the ball set 7 and the ball guide 8 may be omitted. The rail 9 may be integrated with the cover 1.

Figure 13A:
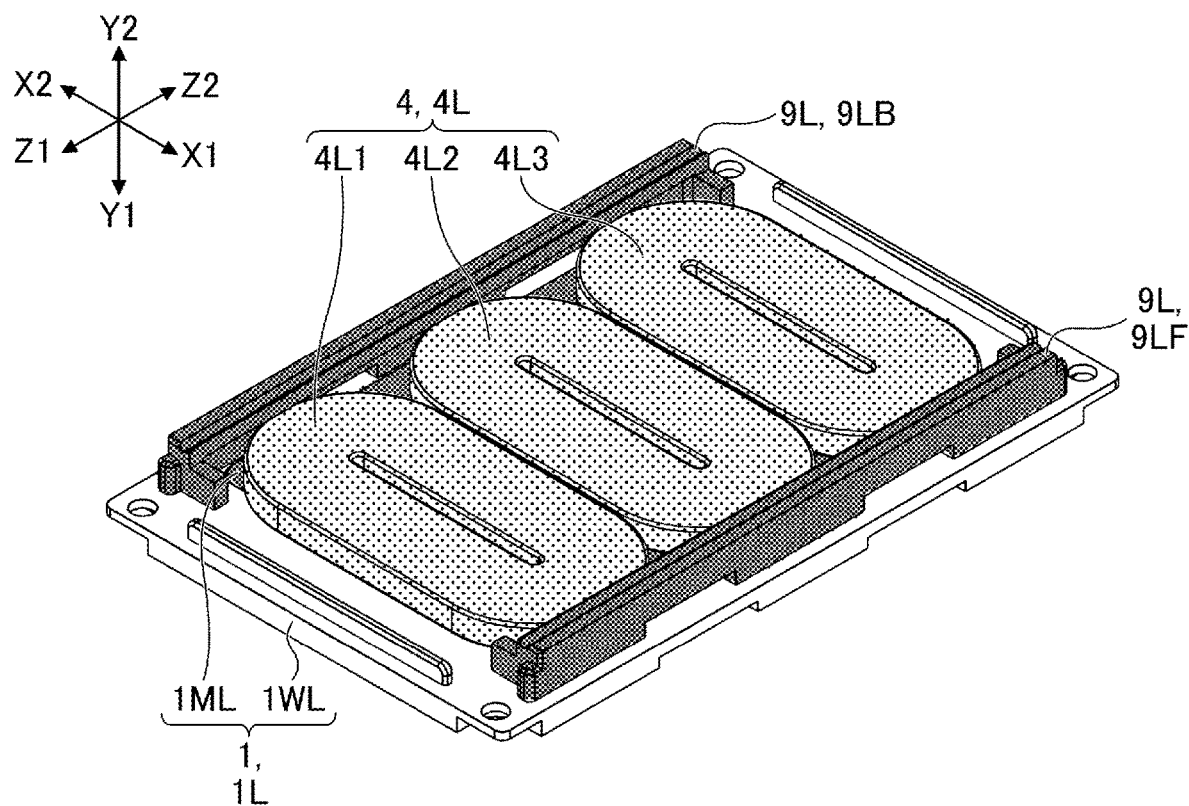
FIG. 13A is a perspective view of coils fixed to a housing.
Figure 13B:
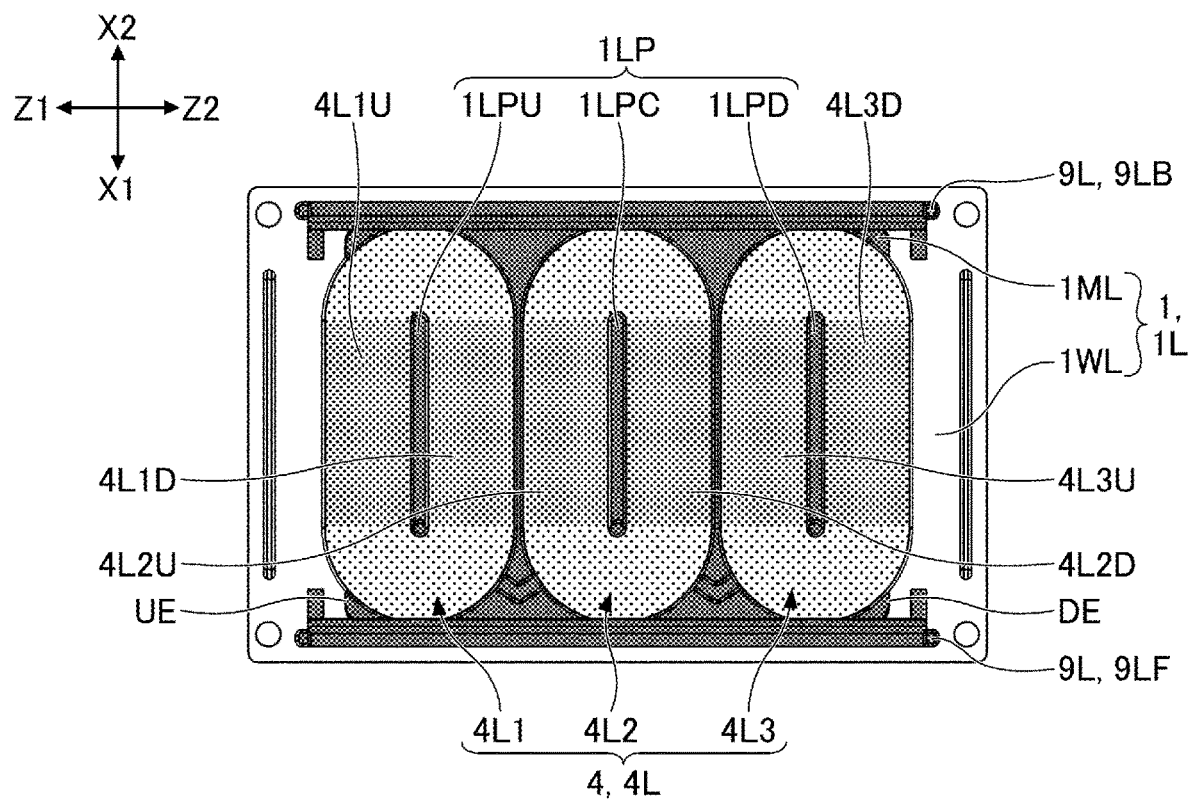
FIG. 13B is a right-side view of the coils fixed to the housing.
Figure 14:
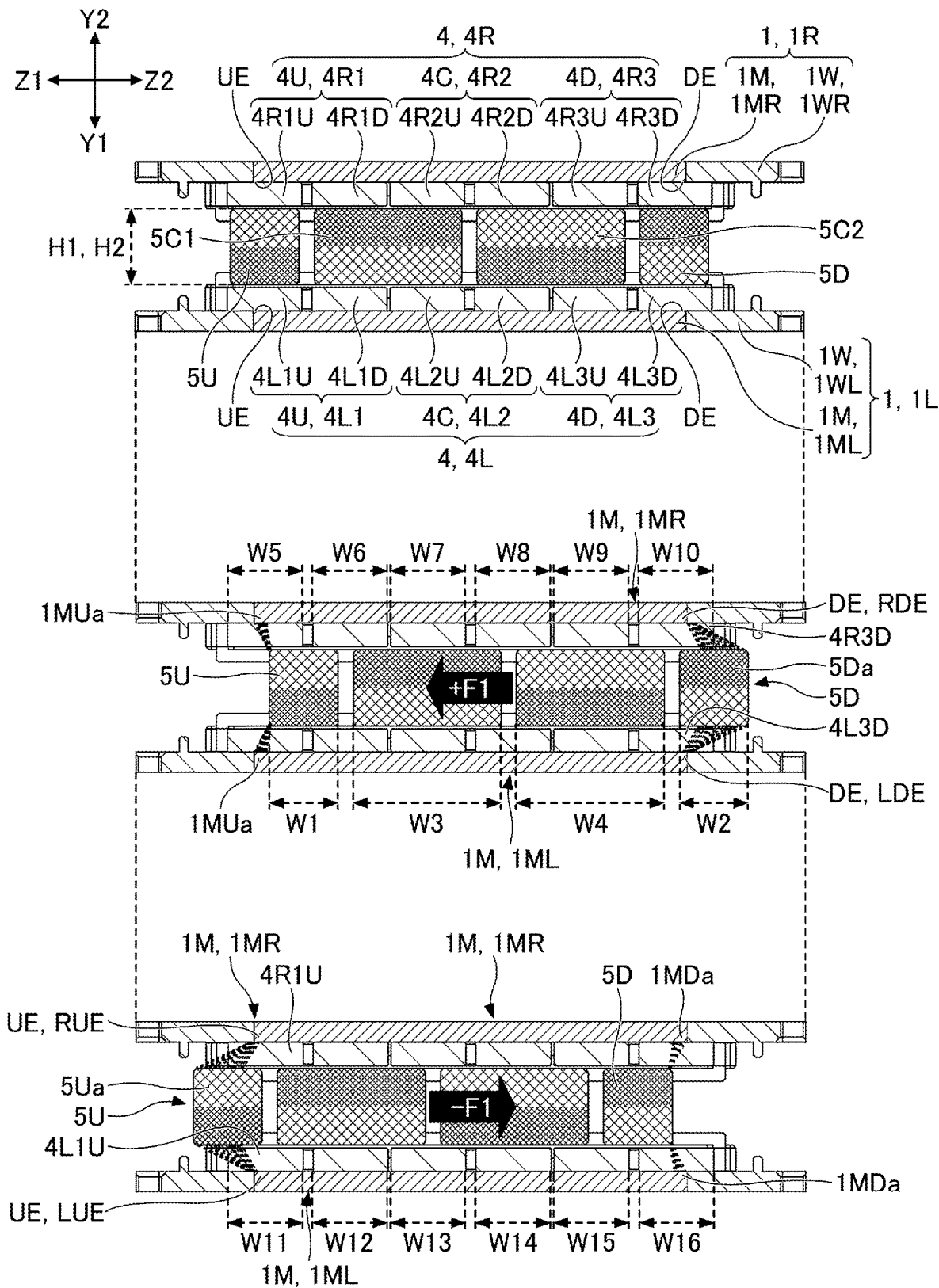
FIG. 14 is a cross-sectional view of a cover, coil, and magnet constituting the linear motion device.
Figure 15:
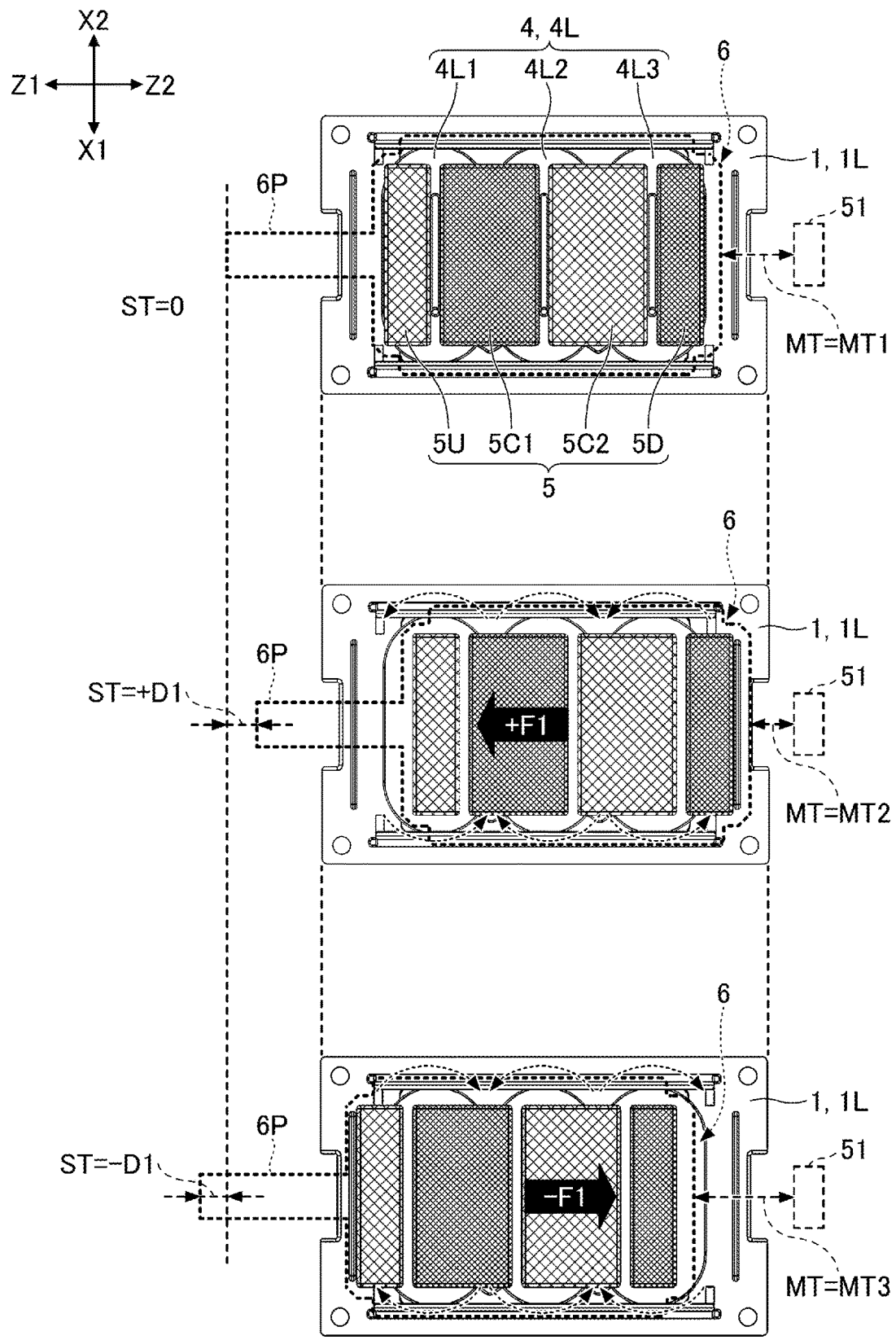
FIG. 15 is a right-side view of a left cover, left coils, and magnet constituting the linear motion device.

Next, the details of the driving means DM will be described with reference to FIGS. 13A, 13B, 14, and 15. FIGS. 13A and 13B are detailed views of the coil 4 fixed to the housing HS. Specifically, FIG. 13A is a perspective view of the left coil 4L fixed to the left cover 1L. FIG. 13B is a right-side view of the left coil 4L fixed to the left cover 1L. In FIGS. 13A and 13B, for clarity, the left coil 4L is provided with a coarse dot pattern, and the left magnetic member 1ML and the left rail 9L are provided with a fine dot pattern. FIG. 14 is a cross-sectional view of the linear motion device 101 in a plane parallel to the XZ plane including the dash-dotted line XIV-XIV illustrated in FIG. 4B when viewed from the X1 side as indicated by an arrow. Specifically, the upper figure of FIG. 14 is a cross-sectional view of the cover 1, the coil 4, and the magnet 5 when the movable member MB (magnet 5) is positioned at the center of the movable range. The middle figure of FIG. 14 is a cross-sectional view of the cover 1, the coil 4, and the magnet 5 when the movable member MB (magnet 5) moves downward (in the Z2 direction) from the center of the movable range. The lower figure of FIG. 14 is a cross-sectional view of the cover 1, the coil 4, and the magnet 5 when the movable member MB (magnet 5) moves upward (in the Z1 direction) from the center of the movable range. FIG. 15 is a right-side view of the magnet 5 capable of moving the right side of the left coil 4L fixed to the left cover 1L in the up-and-down direction (in the Z-axis direction). Specifically, the upper figure of FIG. 15 is a right-side view of the left cover 1L, the left coil 4L, and the magnet 5 when the movable member MB (magnet 5) is located at the center of the movable range, and the state illustrated in the upper figure of FIG. 15 corresponds to the state illustrated in the upper figure of FIG. 14. The middle figure of FIG. 15 is a right-side view of the left cover 1L, the left coil 4L, and the magnet 5 when the movable member MB (magnet 5) moves downward (in the Z2 direction) from the center of the movable range, and the state illustrated in the middle figure of FIG. 15 corresponds to the state illustrated in the middle figure of FIG. 14. The lower figure of FIG. 15 is a right-side view of the left cover 1L, the left coil 4L, and the magnet 5 when the movable member MB (magnet 5) moves upward (in the Z1 direction) from the center of the movable range, and the state illustrated in the lower figure of FIG. 15 corresponds to the state illustrated in the lower figure of FIG. 14. In FIG. 15, the magnet holder 6 and the position sensor 51 are illustrated by dashed lines for clarity.

As illustrated in FIG. 5, the coil 4, which is one of the components of the driving means DM, includes the right coil 4R fixed to the left (Y1 side) surface of the right cover 1R and the left coil 4L fixed to the right (Y2 side) surface of the left cover 1L.

As illustrated in FIGS. 13A and 13B, the left coil 4L includes three coils (first left coil 4L1, second left coil 4L2, and third left coil 4L3) which are fixed to the right-side surface (Y2 side surface) of the left cover 1L by an adhesive. The following description, with reference to FIGS. 13A and 13B, relates to the left coil 4L but applies equally to the right coil 4R. This is because the right cover 1R and the left cover 1L have the same shape and size, and the right coil 4R and the left coil 4L have the same shape and size.

Each of the three coils constituting the left coil 4L is wound around a left internal space 1LP as illustrated in FIG. 13B. Specifically, the first left coil 4L1 is wound around an upper left internal space 1LPU, the second left coil 4L2 is wound around a middle left internal space 1LPC, and the third left coil 4L3 is wound around a lower left internal space 1LPD.

The first left coil 4L1 includes an upper bundle of turns 4L1U positioned above (Z1 side) the upper left internal space 1LPU and extending along the upper left internal space 1LPU, and a lower bundle of turns 4L1D positioned on the lower side (Z2 side) of the upper left internal space 1LPU and extending along the upper left internal space 1LPU. Note that the bundle of turns means a portion where a conductive wire of the coil 4 extends in the front-and-back direction (X-axis direction).

In FIG. 13B, for clarity, the upper bundle of turns 4L1U and the lower bundle of turns 4L1D of the first left coil 4L1 are provided with a dot pattern that is finer than the dot pattern provided to other portions of the first left coil 4L1. The same applies to the second left coil 4L2 and the third left coil 4L3.

The second left coil 4L2 includes upper bundle of turns 4L2U positioned above (Z1 side) the center left inner space 1LPC and extending along the center left inner space 1LPC, and lower bundle of turns 4L2D positioned on the lower side (Z2 side) of the center left inner space 1LPC and extending along the center left inner space 1LPC.

Similarly, the third left coil 4L3 includes upper bundle of turns 4L3U positioned above (Z1 side) the lower left inner space 1LPD and extending along the lower left inner space 1LPD, and lower bundle of turns 4L3D positioned on the lower side (Z2 side) of the lower left inner space 1LPD and extending along the lower left inner space 1LPD.

The upper bundle of turns 4L1U and the lower bundle of turns 4L1D of the first left coil 4L1 are portions through which the magnetic flux generated by the magnet 5 passes, that is, portions that generate a driving force based on Lorentz force for moving the movable member MB in the left-and-right direction. The same applies to the upper bundle of turns 4L2U and the lower bundle of turns 4L2D of the second left coil 4L2, and the upper bundle of turns 4L3U and the lower bundle of turns 4L3D of the third left coil 4L3.

As illustrated in FIG. 14, the magnet 5, which is another component of the driving means DM, is arranged so as to be movable in the up-and-down direction (Z-axis direction) in the space between the right coil 4R and the left coil 4L. Specifically, the magnet 5 includes the upper magnet 5U, the first central magnet 5C1, the second central magnet 5C2, and the lower magnet 5D. Each of the upper magnet 5U, the first central magnet 5C1, the second central magnet 5C2, and the lower magnet 5D is held at a predetermined distance from each other by the magnet holder 6 not illustrated in FIG. 14.

In the present embodiment, as illustrated in the middle figure of FIG. 14, the width W1 of the upper magnet 5U is substantially the same as the width W2 of the lower magnet 5D. The width W3 of the first central magnet 5C1 is substantially the same as the width W4 of the second central magnet 5C2. The width W1 of the upper magnet 5U is substantially ½ of the width W3 of the first central magnet 5C1.

In this embodiment, the six coils constituting the coil 4 have the same shape and size. Note that, as illustrated in the middle and lower figures of FIG. 14, the width W5 of the upper bundle of turns 4R1U of the first right coil 4R1, the width W6 of the lower bundle of turns 4R1D of the first right coil 4R1, the width W7 of the upper bundle of turns 4R2U of the second right coil 4R2, the width W8 of the lower bundle of turns 4R2D of the second right coil 4R2, the width W9 of the upper bundle of turns 4R3U of the third right coil 4R3, the width W10 of the lower bundle of turns 4R3D of the third right coil 4R3, the width W11 of the upper bundle of turns 4L1U of the first left coil 4L1, the width W12 of the lower bundle of turns 4L1D of the first left coil 4L1, the width W13 of the upper bundle of turns 4L2U of the second left coil 4L2, the width W14 of the lower bundle of turns 4L2D of the second left coil 4L2, the width W15 of the upper bundle of turns 4L3U of the third left coil 4L3, and the width W16 of the lower bundle of turns 4L3D of the third left coil 4L3 are all of the same size.

The width W1 of the upper magnet 5U is substantially the same as the width W5 of the upper bundle of turns 4R1U of the first right coil 4R1. The width W3 of the first central magnet 5C1 is substantially the same as the sum of the width W6 of the lower bundle of turns 4R1D of the first right coil 4R1 and the width W7 of the upper bundle of turns 4R2U of the second right coil 4R2.

When the movable member MB (magnet 5) is located at the center of the movable range, as illustrated in the upper figure of FIG. 14, the upper magnet 5U is arranged so that the N-pole portion (right-side portion) faces the upper bundle of turns 4R1U of the first right coil 4R1 and the S-pole portion (left-side portion) faces the upper bundle of turns 4L1U of the first left coil 4L1. The first central magnet 5C1 is arranged so that the S-pole portion (right-side portion) faces the lower bundle of turns 4R1D of the first right coil 4R1 and the upper bundle of turns 4R2U of the second right coil 4R2, and the N-pole portion (left-side portion) faces the lower bundle of turns 4L1D of the first left coil 4L1 and the upper bundle of turns 4L2U of the second left coil 4L2. The second central magnet 5C2 is arranged so that the N-pole portion (right-side portion) faces the lower bundle of turns 4R2D of the second right coil 4R2 and the upper bundle of turns 4R3U of the third right coil 4R3, and the S-pole portion (left-side portion) faces the lower bundle of turns 4L2D of the second left coil 4L2 and the upper bundle of turns 4L3U of the third left coil 4L3. The lower magnet 5D is arranged so that the S-pole portion (right-side portion) faces the lower bundle of turns 4R3D of the third right coil 4R3, and the N-pole portion (left-side portion) faces the lower bundle of turns 4L3D of the third left coil 4L3.

When a current flows through the left coil 4L as illustrated by the dashed arc arrow in the middle figure of FIG. 15, the movable member MB (magnet 5) moves downward (in the Z2 direction) while being guided by the guide means GM. Specifically, when a current flows counterclockwise in the right-side view in the first left coil 4L1, clockwise in the right-side view in the second left coil 4L2, and counterclockwise in the right-side view in the third left coil 4L3, the movable member MB (magnet 5) moves downward (in the Z2 direction).

This is because Lorentz force acts on the charged particles moving in the conductive wire constituting the left coil 4L fixed to the left cover 1L, and the reaction force causes the upper magnet 5U, the first central magnet 5C1, the second central magnet 5C2, and the lower magnet 5D as the magnet 5 to move downward (in the Z2 direction).

Similarly, when a current flows through the left coil 4L as illustrated by the dashed arc arrow in the lower figure of FIG. 15, the movable member MB (magnet 5) moves upward (in the Z1 direction) while being guided by the guide means GM. Specifically, when a current flows clockwise in the right-side view in the first left coil 4L1, counterclockwise in the right-side view in the second left coil 4L2, and clockwise in the right-side view in the third left coil 4L3, the movable member MB (magnet 5) moves upward (in the Z1 direction).

In the present embodiment, even when the movable member MB (magnet 5) is located at the center of the movable range, as illustrated in the upper figure of FIG. 14, a part of the lower magnet 5D projects downward (in the Z2 direction) from the lower end DE of the inner surface (the surface facing the coil 4) of the magnetic member 1M. Also, even when the movable member MB (magnet 5) is located at the center of the movable range, as illustrated in the upper figure of FIG. 14, a part of the upper magnet 5U projects upward (in the Z1 direction) from the upper end UE of the inner surface (the surface facing the coil 4) of the magnetic member 1M.

When the movable member MB (magnet 5) moves downward (in the Z2 direction), as illustrated in the middle figure of FIG. 14, a portion of the lower magnet 5D projects further downward from the lower end DE of the inner surface of the magnetic member 1M. Specifically, a portion of the lower magnet 5D projects further downward from the lower end RDE of the inner surface of the right magnetic member 1MR and further projects downward from the lower end LDE of the inner surface of the left magnetic member 1ML. Since the attraction force acts between the lower magnet 5D and the magnetic member 1M, the portion 5Da of the lower magnet 5D that projects downward from the lower end DE of the inner surface of the magnetic member 1M is attracted upward by the lower end DE of the inner surface of the magnetic member 1M. In this state, the lower end DE of the inner surface of the magnetic member 1M is the portion of the magnetic member 1M closest to the portion 5Da. In the middle figure of FIG. 14, a part of a magnetic field line (the magnetic field line extending between the portion 5Da and the lower end DE) representing a magnetic field generating the attraction force for attracting the lower magnet 5D to the lower end DE of the magnetic member 1M is represented by a dotted line. In the middle figure of FIG. 14, the magnetic field line representing another part of the magnetic field generated by the magnet 5 is omitted for clarity.

When the movable member MB (magnet 5) moves downward (in the Z2 direction), the upper end portion of the magnetic member 1M projects upward from the upper end portion of the upper magnet 5U, as illustrated in the middle figure of FIG. 14. Specifically, the upper end portions of the right magnetic member 1MR and the left magnetic member 1ML project upward from the upper end of the upper magnet 5U. Since an attraction force acts between the upper magnet 5U and the magnetic member 1M, the portion 1MUa of the magnetic member 1M protruding above the upper end of the upper magnet 5U attracts the upper magnet 5U upward. In this state, the upper end of the upper magnet 5U is the portion of the upper magnet 5U closest to the portion 1MUa of the magnetic member 1M. In the middle figure of FIG. 14, a part of the magnetic field line (the magnetic field line extending between the portion 1MUa and the upper end of the upper magnet 50) representing the magnetic field generating the attraction force for attracting the upper magnet 5U to the upper end of the magnetic member 1M is represented by a dotted line.

In this way, the movable member MB (magnet 5) that is displaced downward from the center of the movable range is subjected to a force (attraction force) to pull the movable member MB (magnet 5) back to the center of the movable range. Therefore, the movable member MB comes to rest when the force to move the movable member MB downward (driving force based on Lorentz force) is balanced with the force to pull the movable member MB back to the center of the movable range (attraction force). When the force to move the movable member MB downward disappears, the movable member MB (magnet 5) that is displaced downward from the center of the movable range moves upward by the attraction force and returns to the center of the movable range.

On the other hand, when the movable member MB (magnet 5) moves upward (in the Z1 direction), as illustrated in the lower figure of FIG. 14, a portion of the upper magnet 5U projects further upward from the upper end UE of the inner surface (the surface facing the coil 4) of the magnetic member 1M. Specifically, a portion of the upper magnet 5U projects further upward from the upper end RUE of the inner surface of the right magnetic member 1MR and further projects upward from the upper end LUE of the inner surface of the left magnetic member 1ML. Since an attraction force acts between the upper magnet 5U and the magnetic member 1M, the portion 5Ua of the upper magnet 5U protruding above the upper end UE of the inner surface of the magnetic member 1M is attracted downward by the upper end UE of the inner surface of the magnetic member 1M. In this state, the upper end UE of the inner surface of the magnetic member 1M is the portion of the magnetic member 1M closest to the portion 5Ua. In the lower figure of FIG. 14, a part of the magnetic field line (the magnetic field line extending between the portion 5Ua and the upper end UE) representing the magnetic field generating the attraction force for attracting the upper magnet 5U to the upper end UE of the magnetic member 1M is represented by a dotted line. In the lower figure of FIG. 14, the magnetic field line representing the other part of the magnetic field generated by the magnet 5 is omitted for clarity.

When the movable member MB (magnet 5) moves upward (in the Z1 direction), the lower end portion of the magnetic member 1M projects downward from the lower end of the lower magnet 5D, as illustrated in the lower figure of FIG. 14. Specifically, the lower end portions of the right magnetic member 1MR and the left magnetic member 1ML project downward from the lower end of the lower magnet 5D. Since the attraction force acts between the lower magnet 5D and the magnetic member 1M, the portion 1MDa of the magnetic member 1M that projects downward from the lower end of the lower magnet 5D attracts the lower magnet 5D downward. In this state, the lower end of the lower magnet 5D is the portion of the lower magnet 5D closest to the portion 1MDa of the magnetic member 1M. In the lower figure of FIG. 14, a part of the magnetic field line (the magnetic field line extending between the portion 1MDa and the lower end of the lower magnet 5D) representing the magnetic field generating the attraction force for attracting the lower magnet 5D to the lower end of the magnetic member 1M is represented by a dotted line.

As described above, the movable member MB (magnet 5) that is displaced upward from the center of the movable range is subjected to a force (attraction force) to pull the movable member MB (magnet 5) back to the center of the movable range. Therefore, the movable member MB comes to rest when the force to move the movable member MB upward (driving force based on Lorentz force) is balanced with the force to pull the movable member MB back to the center of the movable range (attraction force). When the force to move the movable member MB upward disappears, the movable member MB (magnet 5) that is displaced upward from the center of the movable range moves downward by the attraction force and returns to the center of the movable range.

Therefore, when the operating force disappears, the movable member MB that is displaced from the center of the movable range is returned to the center of the movable range by the attraction force between the magnet 5 and the magnetic member 1M.

Next, referring again to FIGS. 14 and 15, the details of the linear motion device 101 will be described. The following description referring to FIGS. 14 and 15 relates to the state of the linear motion device 101 when current is not supplied to the coil 4. Specifically, the upper figure of FIG. 14 and the upper figure of FIG. 15 indicate the state of the linear motion device 101 when the movable member MB (magnet 5) is not subjected to an operating force (force to move the head member HD) by an operator. The middle figure of FIG. 14 and the middle figure of FIG. 15 indicate the state of the linear motion device 101 when the movable member MB (magnet 5) is subjected to a downward (Z2 direction) operating force (force to push down the head member HD) by the operator. The lower figure of FIG. 14 and the lower figure of FIG. 15 indicate the state of the linear motion device 101 when the movable member MB (magnet 5) is subjected to an upward (Z1 direction) operating force (force to pull up the head member HD) by the operator.

When the movable member MB (magnet 5) is subjected to a downward (Z2 direction) operating force by the operator as illustrated in the middle figure of FIG. 14 and the middle figure of FIG. 15, the movable member MB (magnet 5) moves downward (Z2 direction) while being guided by the guide means GM in the same manner as in the case the current flows through the left coil 4L as illustrated by the dashed arc arrow in the middle figure of FIG. 15.

When the movable member MB (magnet 5) moves downward (Z2 direction), the upper end portions of the right magnetic member 1MR and the left magnetic member 1ML project upward from the upper end of the upper magnet 5U as illustrated in the middle figure of FIG. 14. Since the attraction force acts between the upper magnet 5U and the magnetic member 1M, the portion 1MUa of the magnetic member 1M that projects upward from the upper end of the upper magnet 5U attracts the upper magnet 5U upward.

Thus, the movable member MB (magnet 5) that is displaced downward from the center of the movable range is subjected to a force (attraction force) to pull the movable member MB (magnet 5) back to the center of the movable range. This attraction force functions as a magnetic operational reaction force F against a downward (Z2 direction) operation force (force to push down the head member HD) by the operator. In the examples illustrated in the middle figure of FIG. 14 and the middle figure of FIG. 15, the magnetic operational reaction force F against the downward (Z2 direction) operation force by the operator is represented by an upward (Z1 direction) block arrow as a force of +F1 (positive value). The movable member MB comes to rest when the force to move the movable member MB downward (downward operation force by the operator) is balanced with the force to pull the movable member MB back to the center of the movable range (attraction force). When the force to move the movable member MB downward (downward operation force by the operator) disappears, the movable member MB (magnet 5) that is displaced downward from the center of the movable range moves upward by the attraction force and returns to the center of the movable range.

When the movable member MB (magnet 5) receives an upward operation force (Z1 direction) by the operator as illustrated in the lower figure of FIG. 14 and the lower figure of FIG. 15, the movable member MB (magnet 5) moves upward (Z1 direction) while being guided by the guide means GM, as in the case where a current flows through the left coil 4L as illustrated by the dashed arc arrow in the lower figure of FIG. 15.

When the movable member MB (magnet 5) moves upward (Z1 direction), the lower end portions of the right magnetic member 1MR and the left magnetic member 1ML project downward from the lower end of the lower magnet 5D as illustrated in the lower figure of FIG. 14. Since the attraction force acts between the lower magnet 5D and the magnetic member 1M, the portion 1MDa of the magnetic member 1M that projects downward from the lower end of the lower magnet 5D attracts the lower magnet 5D downward.

Thus, the movable member MB (magnet 5) that is displaced upward from the center of the movable range is subjected to a force (attraction force) to pull the movable member MB (magnet 5) back to the center of the movable range. This attraction force functions as a magnetic operational reaction force F against an upward (Z1 direction) operation force (a force to pull up the head member HD) by the operator. In the examples illustrated in the lower figure of FIG. 14 and the lower figure of FIG. 15, the magnetic operational reaction force F against the upward (Z1 direction) operation force by the operator is represented by a downward (Z2 direction) block arrow as a force of −F1 (negative value). The movable member MB comes to rest when a force to move the movable member MB upward (upward operation force by the operator) is balanced with a force to pull the movable member MB back to the center of the movable range (attraction force). When the force to move the movable member MB upward (upward operation force by the operator) disappears, the movable member MB (magnet 5) that is displaced upward from the center of the movable range moves downward by the attraction force and returns to the center of the movable range.

Figure 16:
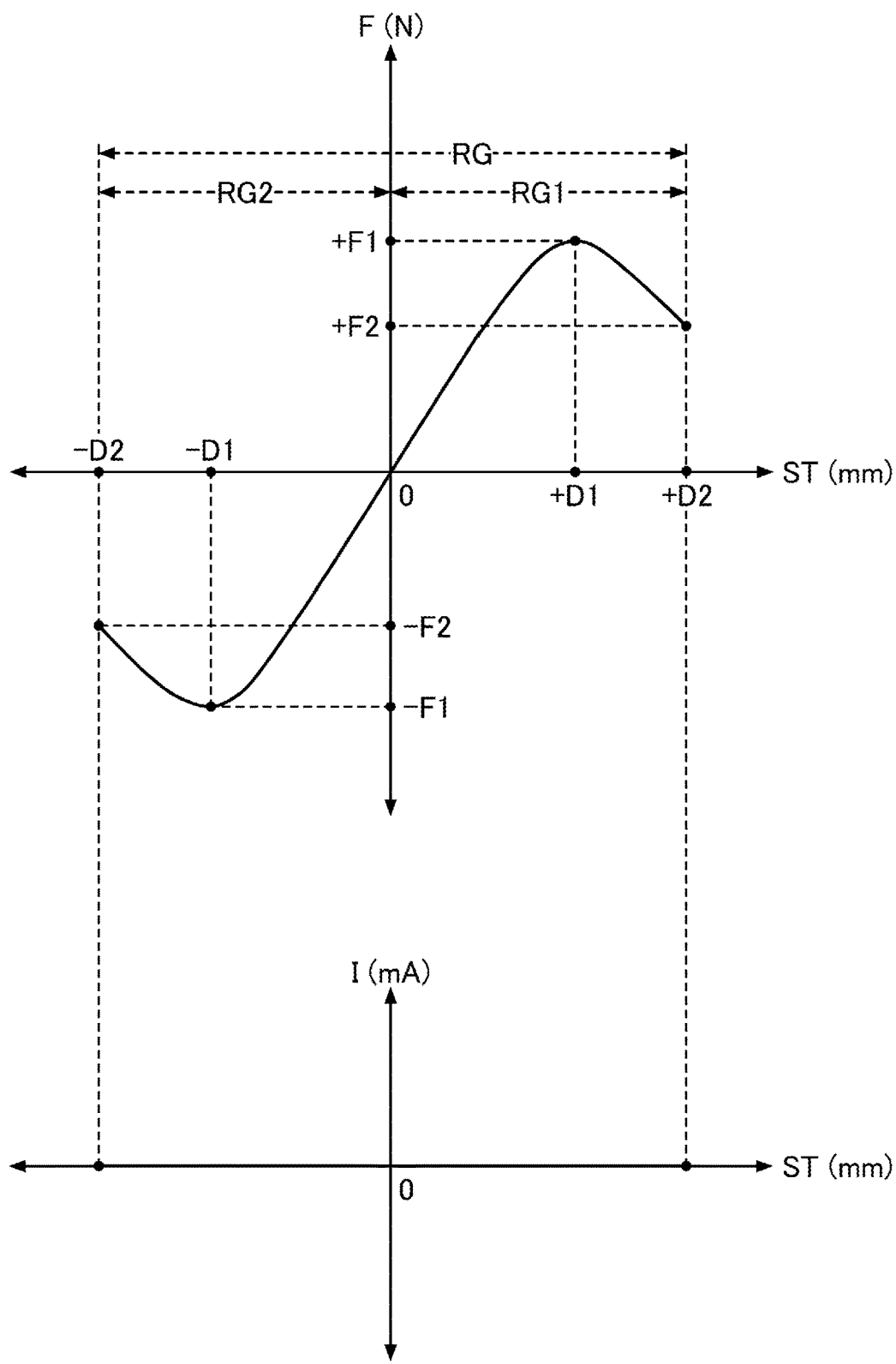
FIG. 16 is a graph illustrating an example of the relationship between a magnetic operational reaction force, a stroke amount, and a current.

Next, an example of the relationship between the magnetic operational reaction force F, the stroke amount ST and the current I will be described with reference to FIG. 16. The magnetic operational reaction force F is a magnetic operational reaction force acting on the movable member MB. The stroke amount ST is the amount of movement of the movable member MB in the up-and-down direction (Z-axis direction), and becomes 0 when the movable member MB is positioned at the center of the movable range (the state illustrated in the upper figure of FIG. 14 and the upper figure of FIG. 15). The current I is the current flowing through the coil 4. FIG. 16 is a graph illustrating an example of the relationship between the magnetic operational reaction force F, the stroke amount ST, and the current I. Specifically, the upper figure of FIG. 16 is a graph in which the vertical axis is the magnetic operational reaction force F and the horizontal axis is the stroke amount ST, and the lower figure of FIG. 16 is a graph in which the vertical axis is the current I and the horizontal axis is the stroke amount ST. Note that the horizontal axis (stroke amount ST) in the upper figure of FIG. 16 and the horizontal axis (stroke amount ST) in the lower figure of FIG. 16 correspond to each other. In the following description with reference to FIG. 16, the magnetic operational reaction force F and the stroke amount ST when the movable member MB is depressed are defined as positive values, and the magnetic operational reaction force F and the stroke amount ST when the movable member MB is pulled up are defined as negative values. Therefore, an increase in the magnetic operational reaction force F and the stroke amount ST when the movable member MB is pulled up means that its absolute value increases, and a decrease in the magnetic operational reaction force F and the stroke amount ST when the movable member MB is pulled up means that its absolute value decreases. The same applies to the description referring to FIGS. 17 and 18.

The relationship between the magnetic operational reaction force F and the stroke amount ST illustrated in the upper figure of FIG. 16 illustrates a relationship when the current I is 0, that is, when a current is not supplied to the coil 4, as illustrated in the lower figure of FIG. 16. The upper figure of FIG. 16 illustrates that the magnetic operational reaction force F becomes 0 when the stroke amount ST is 0. In the following, the position of the movable member MB when the magnetic operational reaction force F becomes 0 is referred to as the "reference position". The movable member MB is positioned at the reference position when the operation force by the operator is not acting on the movable member MB. The movable member MB which is not in the reference position returns to the reference position when the operation force by the operator disappears.

The upper figure of FIG. 15 illustrates the state of the left cover 1L, the left coil 4L, and the magnet 5 when the stroke amount ST is 0. The upper figure of FIG. 15 illustrates that the stroke amount ST is 0 when the measured value MT of the position sensor 51 is MT1. In the illustrated example, the measured value MT corresponds to the distance between the magnet holder 6 and the position sensor 51.

Specifically, the upper figure of FIG. 16 illustrates that the movable range of the movable member MB in the Z-axis direction has a width RG. More specifically, the upper figure of FIG. 16 illustrates that the movable range when the movable member MB is depressed has a width RG1, and the movable range when the movable member MB is pulled up has a width RG2. In the illustrated example, the width RG1 and the width RG2 have the same size.

The upper figure of FIG. 16 illustrates that the magnetic operational reaction force F increases substantially linearly as the stroke amount ST when the movable member MB is depressed increases, and the magnetic operational reaction force F reaches +F1 (upper maximum value) when the stroke amount ST becomes +D1. The middle figure of FIG. 15 illustrates the state of the left cover 1L, the left coil 4L, and the magnet 5 when the stroke amount ST becomes +D1. The middle figure of FIG. 15 illustrates that the stroke amount ST is +D1 when the measured value MT of the position sensor 51 is MT2.

The upper figure of FIG. 16 illustrates that the magnetic operational reaction force F decreases substantially linearly as the stroke amount ST when the movable member MB is depressed increases further beyond +D1, and the magnetic operational reaction force F becomes +F2 (upper end value) when the stroke amount ST becomes +D2. +D2 is the stroke amount when the movement of the movable member MB downward (in the Z2 direction) is stopped by a stopper portion. In the illustrated example, +D2 is the stroke amount when the lower end portion of the magnet holder 6 contacts the inner surface (Z1 side surface) of the fourth plate portion 2A4 of the cylindrical body 2. In this case, the fourth plate portion 2A4 functions as the stopper portion.

Similarly, the upper figure of FIG. 16 illustrates that the magnetic operational reaction force F increases substantially linearly as the stroke amount ST when the movable member MB is pulled up increases, and the magnetic operational reaction force F reaches −F1 (the lower maximum value) when the stroke amount ST becomes −D1. The lower figure of FIG. 15 illustrates the state of the left cover 1L, the left coil 4L, and the magnet 5 when the stroke amount ST becomes −D1. The lower figure of FIG. 15 illustrates that the stroke amount ST is −D1 when the measured value MT of the position sensor 51 is MT3.

The upper figure of FIG. 16 illustrates that the magnetic operational reaction force F decreases approximately linearly as the stroke amount ST when the movable member MB is pulled up further increases beyond −D1, and the magnetic operational reaction force F becomes −F2 (lower end value) when the stroke amount ST becomes −D2. −D2 is the stroke amount when the movement of the movable member MB upward (in the Z1 direction) is stopped by the stopper portion. In the illustrated example, −D2 is the stroke amount when the upper end portion of the magnet holder 6 comes into contact with the inner surface (Z2 side surface) of the second plate portion 2A2 of the cylindrical body 2. In this case, the second plate portion 2A2 functions as the stopper portion.

Figure 17:
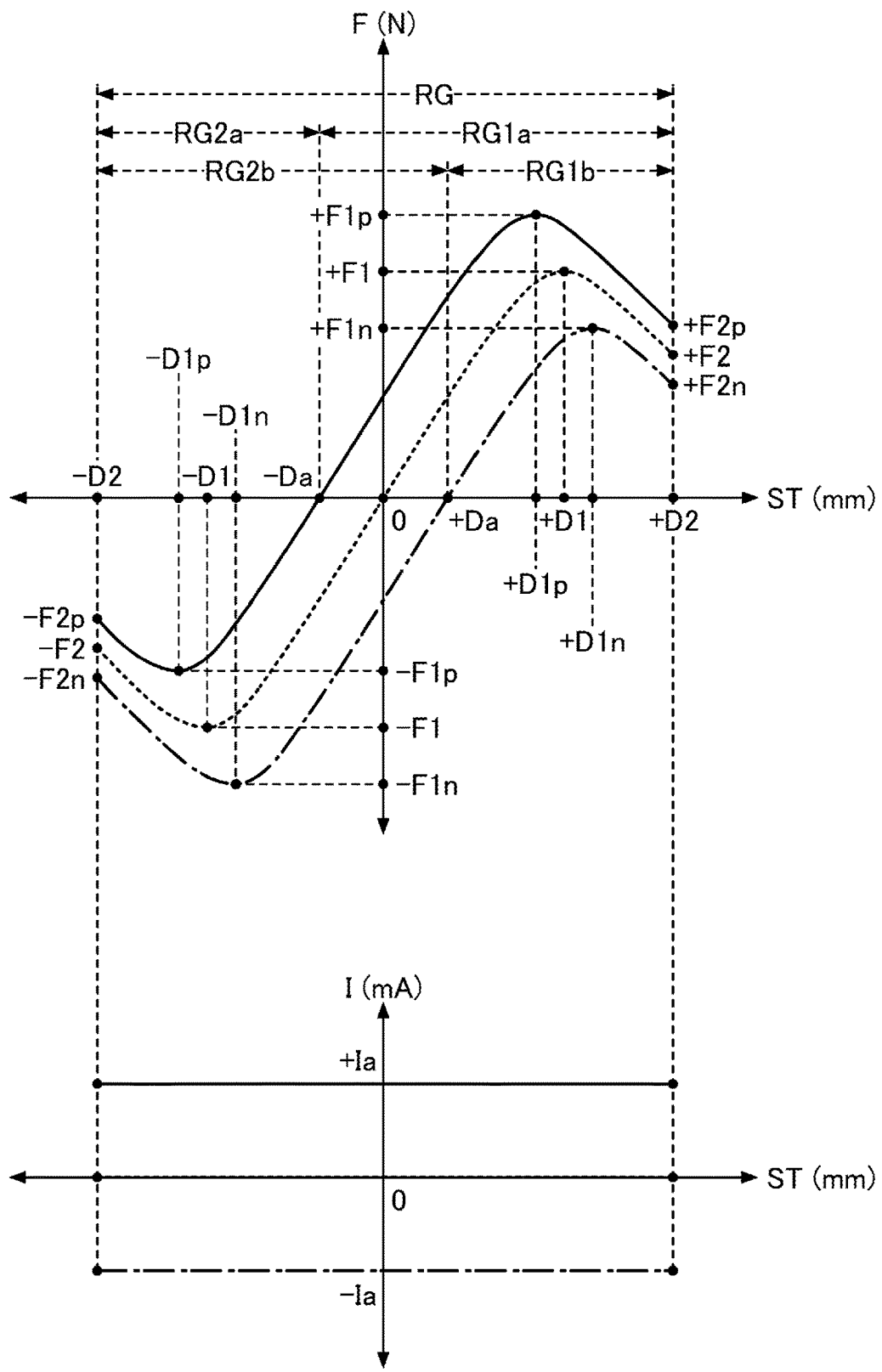
FIG. 17 is a graph illustrating another example of the relationship between the magnetic operational reaction force, the stroke amount, and the current.

Next, another example of the relationship between the magnetic operational reaction force F, the stroke amount ST, and the current I will be described with reference to FIG. 17. FIG. 17 is a graph illustrating another example of the relationship between the magnetic operational reaction force F, the stroke amount ST, and the current I, corresponding to FIG. 16. Specifically, the upper figure of FIG. 17 is a graph in which the vertical axis is the magnetic operational reaction force F and the horizontal axis is the stroke amount ST, and corresponds to the upper figure of FIG. 16. The lower figure of FIG. 17 is a graph in which the vertical axis is the current I and the horizontal axis is the stroke amount ST, and corresponds to the lower figure of FIG. 16. Note that the horizontal axis (stroke amount ST) in the upper figure of FIG. 17 and the horizontal axis (stroke amount ST) in the lower figure of FIG. 17 correspond to each other.

The relationship between the magnetic operational reaction force F and the stroke amount ST illustrated by the dotted characteristic line in the upper figure of FIG. 17 illustrates a relationship when a current I is 0, that is, when the current is not supplied to the coil 4, as illustrated by the dotted characteristic line in the lower figure of FIG. 17. This relationship corresponds to the relationship illustrated in FIG. 16.

The relationship between the magnetic operational reaction force F and the stroke amount ST illustrated by the solid characteristic line in the upper figure of FIG. 17 illustrates the relationship when a current I is +Ia, that is, when the current having the magnitude Ia flows through the coil 4 in the first energizing direction, as indicated by the solid characteristic line in the lower figure of FIG. 17.

The relationship between the magnetic operational reaction force F and the stroke amount ST illustrated by the dash-dotted characteristic line in the upper figure of FIG. 17 illustrates the relationship when a current I is −Ia, that is, when the current having the magnitude Ia flows through the coil 4 in the second energizing direction (the reverse direction of the first energizing direction), as illustrated by the dash-dot characteristic line in the lower figure of FIG. 17.

Specifically, the solid characteristic line in the upper figure of FIG. 17 indicates that when the current having the magnitude Ia flows through the coil 4 in the first energizing direction, the magnetic operational reaction force F becomes 0 when the stroke amount ST is −Da. That is, the solid characteristic line in the upper figure of FIG. 17 indicates that the movable member MB is positioned at the reference position when the stroke amount ST is −Da. This means that when the current having a magnitude Ia flows through the coil 4 in the first energizing direction, the movable member MB moves upward (in the Z1 direction) and the movable member MB is stationary at the position where the stroke amount ST is −Da. That is, when the operating force by the operator is not acting on the movable member MB, the movable member MB is stationary at the position where the stroke amount ST is −Da. In this case, the movable range of the movable member MB in the Z-axis direction has the same width RG as the width RG when the current is not supplied to the coil 4. However, the movable range when the movable member MB is depressed has the width RG1a larger than the width RG1 when the current is not supplied to the coil 4 (see the upper figure of FIG. 16), and the movable range when the movable member MB is pulled up has a width RG2a smaller than the width RG2 when the current is not supplied to the coil 4 (see the upper figure of FIG. 16).

In the illustrated example, the stationary state of the movable member MB means a state where the force to move the movable member MB in the Z1 direction is balanced with the force to move the movable member MB in the Z2 direction. That is, the stationary state of the movable member MB means a state where the resultant force of the driving force based on Lorentz force generated by the driving means DM (coil 4 and magnet 5), the attraction force between the magnet 5 and the magnetic member 1M, and the operating force by the operator become 0 in the Z-axis direction. When the operating force is not generated, the stationary state of the movable member MB means a state in which the resultant force of the driving force and the attraction force become 0 in the Z-axis direction.

Conversely, the characteristic line of the dash-dotted line in the upper figure of FIG. 17 indicates that when a current having a magnitude Ia flows through the coil 4 in the second energizing direction, the magnetic operational reaction force F becomes 0 when the stroke amount ST is +Da. That is, the characteristic line of the dash-dotted line in the upper figure of FIG. 17 indicates that the movable member MB is positioned at the reference position when the stroke amount ST is +Da. This means that when the current having the magnitude Ia flows through the coil 4 in the second energizing direction, the movable member MB moves downward (in the Z2 direction) and the movable member MB is stationary at the position where the stroke amount ST is +Da. That is, when the operating force by the operator is not acting on the movable member MB, the movable member MB is stationary at the position where the stroke amount ST is +Da. In this case, the movable range of the movable member MB in the Z-axis direction has the same width RG as the width RG when the current is not supplied to the coil 4. However, the movable range when the movable member MB is depressed has a width RG1$b$ smaller than the width RG1 when the current is not supplied to the coil 4 (see the upper figure of FIG. 16), and the movable range when the movable member MB is pulled up has a width RG2$b$ larger than the width RG2 when the current is not supplied to the coil 4 (see the upper figure of FIG. 16).

The solid characteristic line in the upper figure of FIG. 17 indicates that, as in the case the current is not supplied to the coil 4, the magnetic operational reaction force F increases substantially linearly as the stroke amount ST when the movable member MB is depressed increases, and the magnetic operational reaction force F reaches +F1$p$ (upper maximum value) when the stroke amount ST becomes +D1$p$. Note that +D1$p$ is smaller than +D1, which is the stroke amount when the magnetic operational reaction force F becomes +F1 (upper maximum value) in the state where the current is not supplied to the coil 4, and +F1$p$ (upper maximum value) is larger than +F1, which is the upper maximum value of the magnetic operational reaction force F when the current is not supplied to the coil 4.

The solid characteristic line in the upper figure of FIG. 17 indicates that, as in the case where the current is not supplied to the coil 4, the magnetic operational reaction force F decreases substantially linearly as the stroke amount ST when the movable member MB is depressed increases further beyond +D1$p$, and when the stroke amount ST becomes +D2, the magnetic operational reaction force F becomes +F2$p$ (upper end value). Note that +F2$p$ (upper end value) is larger than +F2, which is the upper end value when the current is not supplied to the coil 4.

Similarly, the solid characteristic line in the upper figure of FIG. 17 indicates that, as in the case the current is not supplied to the coil 4, the magnetic operational reaction force F increases substantially linearly as the stroke amount ST increases when the movable member MB is pulled up, and the magnetic operational reaction force F reaches −F1$p$ (lower maximum value) when the stroke amount ST becomes −D1$p$. Note that the absolute value of −D1$p$ is larger than the absolute value of −D1, which is the stroke amount when the magnetic operational reaction force F becomes −F1 (lower maximum value) when the current is not supplied to the coil 4, and the absolute value of −F1$p$ (lower maximum value) is smaller than the absolute value of −F1, which is the lower maximum value of the magnetic operational reaction force F when the current is not supplied to the coil 4.

The solid characteristic line in the upper figure of FIG. 17 indicates that, as in the case the current is not supplied to the coil 4, the magnetic operational reaction force F decreases substantially linearly as the stroke amount ST when the movable member MB is pulled up further increases beyond −D1$p$, and the magnetic operational reaction force F becomes −F2$p$ (lower end value) when the stroke amount ST becomes −D2. The absolute value of −F2$p$ (lower end value) is smaller than the absolute value of −F2, which is the lower end value when the current is not supplied to the coil 4.

Thus, by controlling the direction and magnitude of the current flowing through the coil 4 so that the current having the magnitude Ia flows through the coil 4 in the first energizing direction, the control unit CTR can realize the relationship between the magnetic operational reaction force F and the stroke amount ST, represented by the characteristic line of the solid characteristic line in the upper figure of FIG. 17. That is, the control unit CTR can shift the characteristic line (the characteristic line of the dotted line in the upper figure of FIG. 17) upward when the current is not supplied to the coil 4.

The characteristic line of the dash-dotted line in the upper figure of FIG. 17 indicates that, as in the case the current is not supplied to the coil 4, the magnetic operational reaction force F increases substantially linearly as the stroke amount ST when the movable member MB is depressed increases, and the magnetic operational reaction force F reaches +F1$n$ (upper maximum value) when the stroke amount ST becomes +D1$n$. Note that +D1$n$ is larger than +D1, which is the stroke amount when the magnetic operational reaction force F becomes +F1 (upper maximum value) when the current is not supplied to the coil 4, and +F1$n$ (upper maximum value) is smaller than +F1, which is the upper maximum value of the magnetic operational reaction force F when the current is not supplied to the coil 4.

The characteristic line of the dash-dotted line in the upper figure of FIG. 17 indicates that, as in the case the current is not supplied to the coil 4, the magnetic operational reaction force F decreases substantially linearly as the stroke amount ST when the movable member MB is depressed increases further beyond +D1$n$, and the magnetic operational reaction force F becomes +F2$n$ (upper end value) when the stroke amount ST becomes +D2. Note that +F2$n$ (upper end value) is smaller than +F2, which is the upper end value when the current is not supplied to the coil 4.

Similarly, the characteristic line of the dash-dotted line in the upper figure of FIG. 17 indicates that, as in the case the current is not supplied to the coil 4, the magnetic operational reaction force F increases substantially linearly as the stroke amount ST when the movable member MB is pulled up increases, and the magnetic operational reaction force F reaches −F1$n$ (lower maximum value) when the stroke amount ST becomes −D1$n$. Note that the absolute value of −D1$n$ is smaller than the absolute value of −D1, which is the stroke amount when the magnetic operational reaction force F becomes −F1 (lower maximum value) when the current is not supplied to the coil 4, and the absolute value of −F1$n$ (lower maximum value) is larger than the absolute value of −F1, which is the lower maximum value when the current is not supplied to the coil 4.

The characteristic line of the dash-dotted line in the upper figure of FIG. 17 indicates that, as in the case the current is not supplied to the coil 4, the magnetic operational reaction force F decreases substantially linearly as the stroke amount ST when the movable member MB is pulled up further increases beyond −D1$n$, and the magnetic operational reaction force F becomes −F2$n$ (lower end value) when the stroke amount ST becomes −D2. The absolute value of −F2$n$ (lower end value) is larger than the absolute value of −F2 which is the lower end value when the current is not supplied to the coil 4.

Thus, by controlling the direction and magnitude of the current flowing through the coil 4 so that the current having the magnitude Ia flows through the coil 4 in the second energizing direction, the control unit CTR can realize the relationship between the magnetic operational reaction force F and the stroke amount ST, represented by the characteristic line of the dash-dotted line in the upper figure of FIG. 17. That is, the control unit CTR can shift the characteristic line (the characteristic line of the dotted line in the upper figure of FIG. 17) downward when the current is not supplied to the coil 4.

Figure 18:
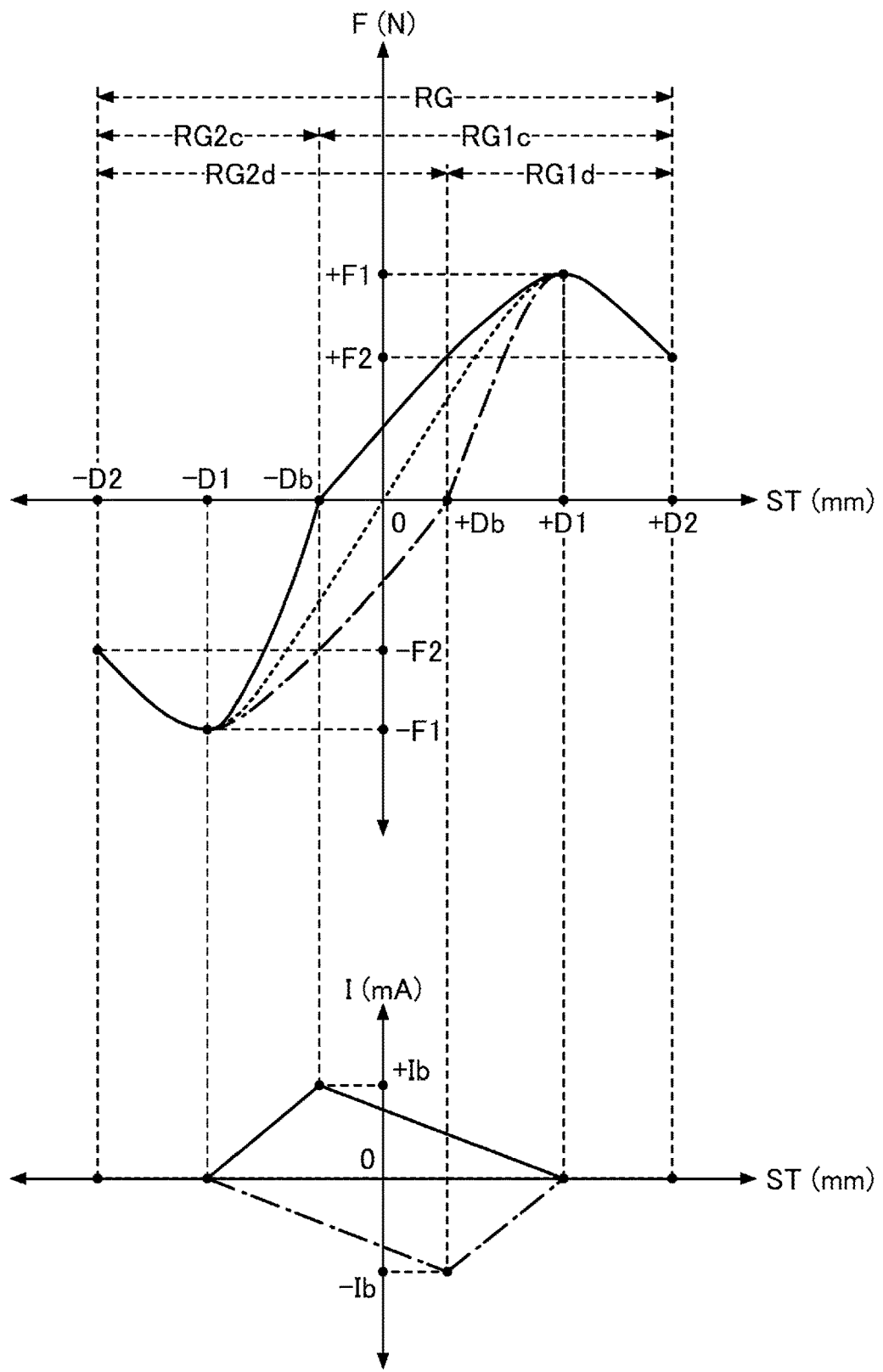
FIG. 18 is a graph illustrating yet another example of the relationship between the magnetic operational reaction force, the stroke amount, and the current.

Referring now to FIG. 18, yet another example of the relationship between the magnetic operational reaction force F, the stroke amount ST, and the current I will be described. FIG. 18 is a graph illustrating yet another example of the relationship between the magnetic operational reaction force F, the stroke amount ST, and the current I, corresponding to FIGS. 16 and 17, respectively. Specifically, the upper figure of FIG. 18 is a graph in which the vertical axis is the magnetic operational reaction force F and the horizontal axis is the stroke amount ST, corresponding to the upper figures of FIGS. 16 and 17, respectively. The lower figure of FIG. 18 is a graph in which the vertical axis is the current I and the horizontal axis is the stroke amount ST, corresponding to the lower figures of FIGS. 16 and 17, respectively. The horizontal axis (stroke amount ST) in the upper figure of FIG. 18 and the horizontal axis (stroke amount ST) in the lower figure of FIG. 18 correspond to each other.

The relationship between the magnetic operational reaction force F and the stroke amount ST illustrated by the dotted characteristic line in the upper figure of FIG. 18 indicates a relationship when the current I is 0, that is, when the current is not supplied to the coil 4, as illustrated by the dotted characteristic line in the lower figure of FIG. 18. This relationship corresponds to the relationship illustrated in FIG. 16.

The relationship between the magnetic operational reaction force F and the stroke amount ST illustrated by the solid characteristic line in the upper figure of FIG. 18 indicates the relationship when the current I changes as indicated by the solid characteristic line in the lower figure of FIG. 18, that is, when the variable current having the maximum value +Ib flows through the coil 4 in the first energizing direction.

The relationship between the magnetic operational reaction force F and the stroke amount ST illustrated by the characteristic line of the dash-dotted line in the upper figure of FIG. 18 indicates the relationship when the current I changes as illustrated by the characteristic line of the dash-dotted line in the lower figure of FIG. 18, that is, when the current having the maximum value Ib flows through the coil 4 in the second energizing direction (the reverse direction of the first energizing direction).

Specifically, the solid characteristic line in the upper figure of FIG. 18 indicates that when the current having the magnitude Ib flows through the coil 4 in the first energizing direction, the magnetic operational reaction force F becomes 0 when the stroke amount ST is −db. That is, the solid characteristic line in the upper figure of FIG. 18 indicates that the movable member MB is located at the reference position when the stroke amount ST is −db. This means that when the current having the size Ib flows through the coil 4 in the first energizing direction, the movable member MB moves upward (in the Z1 direction) and the movable member MB is stationary at the position where the stroke amount ST is −db. That is, when the operating force by the operator is not acting on the movable member MB, the movable member MB is stationary at the position where the stroke amount ST is −db. In this case, the movable range of the movable member MB in the Z-axis direction has the same width RG as the width RG when the current is not supplied to the coil 4. However, the movable range when the movable member MB is depressed has a width RG1c larger than the width RG1 when the current is not supplied to the coil 4 (see the upper figure of FIG. 16), and the movable range when the movable member MB is pulled up has a width RG2c smaller than the width RG2 when the current is not supplied to the coil 4 (see the upper figure of FIG. 16).

On the contrary, the characteristic line of the dash-dotted line in the upper figure of FIG. 18 indicates that when a current having a size Ib flows through the coil 4 in the second energizing direction, the magnetic operational reaction force F becomes 0 when the stroke amount ST is +db. That is, the characteristic line of the dash-dotted line in the upper figure of FIG. 18 indicates that the movable member MB is located at the reference position when the stroke amount ST is +db. This means that when the current having the size Ib flows through the coil 4 in the second energizing direction, the movable member MB moves downward (in the Z2 direction) and the movable member MB is stationary at the position where the stroke amount ST is +db. That is, when the operating force by the operator is not acting on the movable member MB, the movable member MB is stationary at the position where the stroke amount ST is +db. In this case, the movable range of the movable member MB in the Z-axis direction has the same width RG as the width RG when the current is not supplied to the coil 4. However, the movable range when the movable member MB is depressed has a width RG1d smaller than the width RG1 when the current is not supplied to the coil 4 (see the upper figure of FIG. 16), and the movable range when the movable member MB is pulled up has a width RG2d larger than the width RG2 when the current is not supplied to the coil 4 (see the upper figure of FIG. 16).

The solid characteristic line in the upper figure of FIG. 18 indicates that, as in the case the current is not supplied to the coil 4, the magnetic operational reaction force F increases substantially linearly as the stroke amount ST when the movable member MB is depressed increases, and the magnetic operational reaction force F reaches +F1 (upper maximum value) when the stroke amount ST becomes +D1.

In the example illustrated in FIG. 18, the control unit CTR changes the magnitude of the current flowing through the coil 4 in the first energizing direction according to the output of the position sensor 51, as illustrated by the solid characteristic line in the lower figure of FIG. 18. Specifically, the control unit CTR derives the stroke amount ST of the movable member MB based on the output of the position sensor 51, and changes the magnitude of the current according to the change in the stroke amount ST. More specifically, the control unit CTR linearly reduces the magnitude of the current flowing through the coil 4 in the first energizing direction to 0 while the stroke amount ST varies from −db through 0 to +D1.

The solid characteristic line in the upper figure of FIG. 18 indicates that, as in the case the current is not supplied to the coil 4, the magnetic operational reaction force F decreases substantially linearly as the stroke amount ST when the movable member MB is depressed further increases beyond +D1, and the magnetic operational reaction force F becomes +F2 (upper end value) when the stroke amount ST becomes +D2. When the stroke amount ST is between +D1 and +D2, the solid characteristic line in the upper figure of FIG. 18 completely coincides with the solid characteristic line in the upper figure of FIG. 16. When the stroke amount ST is between +D1 and +D2, the control unit CTR maintains the magnitude of the current flowing through the coil 4 at 0.

Similarly, the solid characteristic line in the upper figure of FIG. 18 indicates that the magnetic operational reaction force F increases substantially linearly as the stroke amount ST increases when the movable member MB is pulled up, as in the case the current is not supplied to the coil 4, and that the magnetic operational reaction force F reaches −F1 (the lower maximum value) when the stroke amount ST becomes −D1.

In the example illustrated in FIG. 18, the control unit CTR changes the magnitude of the current flowing through the coil 4 in the first energizing direction according to the output of the position sensor 51, as illustrated by the solid characteristic line in the lower figure of FIG. 18. Specifically, the control unit CTR derives the stroke amount ST of the movable member MB based on the output of the position sensor 51, and changes the magnitude of the current according to the change in the stroke amount ST. More specifically, the control unit CTR linearly reduces the magnitude of the current flowing through the coil 4 in the first energizing direction to 0 while the stroke amount ST varies from −db to −D1.

The solid characteristic line in the upper figure of FIG. 18 indicates that, as in the case the current is not supplied to the coil 4, the magnetic operational reaction force F decreases substantially linearly as the stroke amount ST when the movable member MB is pulled up further increases beyond −D1, and the magnetic operational reaction force F becomes −F2 (lower end value) when the stroke amount ST becomes −D2. When the stroke amount ST is between −D1 and −D2, the solid characteristic line in the upper figure of FIG. 18 completely coincides with the solid characteristic line in the upper figure of FIG. 16. When the stroke amount ST is between −D1 and −D2, the control unit CTR maintains the magnitude of the current flowing through the coil 4 at 0.

Thus, by controlling the magnitude of the current flowing through the coil 4 in the first energizing direction, the control unit CTR can realize the relationship between the magnetic operational reaction force F and the stroke amount ST, represented by the characteristic line of the solid characteristic line in FIG. 18. That is, the control unit CTR can shift the reference position of the movable member MB upward (in the Z1 direction) while maintaining the upper maximum value, lower maximum value, upper end value, and lower end value of the characteristic line (the characteristic line of the dotted line in the upper figure of FIG. 18) when the current is not supplied to the coil 4.

The characteristic line of the dash-dotted line in the upper figure of FIG. 18 indicates that, as in the case the current is not supplied to the coil 4, the magnetic operational reaction force F increases substantially linearly as the stroke amount ST when the movable member MB is depressed increases, and the magnetic operational reaction force F reaches +F1 (the upper maximum value) when the stroke amount ST becomes +D1.

In the example illustrated in FIG. 18, the control unit CTR changes the magnitude of the current flowing through the coil 4 in the second energizing direction according to the output of the position sensor 51, as illustrated by the characteristic line of the dash-dotted line in the lower figure of FIG. 18. Specifically, the control unit CTR derives the stroke amount ST of the movable member MB based on the output of the position sensor 51, and changes the magnitude of the current according to the change in the stroke amount ST. More specifically, the control unit CTR linearly reduces the magnitude of the current flowing through the coil 4 in the second energizing direction to 0 while the stroke amount ST changes from +db to +D1.

The characteristic line of the dash-dotted line in the upper figure of FIG. 18 indicates that, as in the case the current is not supplied to the coil 4, the magnetic operational reaction force F decreases substantially linearly as the stroke amount ST when the movable member MB is depressed increases further beyond +D1, and the magnetic operational reaction force F becomes +F2 (upper end value) when the stroke amount ST becomes +D2. When the stroke amount ST is between +D1 and +D2, the characteristic line of the dash-dotted line in the upper figure of FIG. 18 completely coincides with the characteristic line of the solid characteristic line in the upper figure of FIG. 16. When the stroke amount ST is between +D1 and +D2, the control unit CTR maintains the magnitude of the current flowing through the coil 4 at 0.

Similarly, the characteristic line of the dash-dotted line in the upper figure of FIG. 18 indicates that, as in the case the current is not supplied to the coil 4, the magnetic operational reaction force F increases substantially linearly as the stroke amount ST increases when the movable member MB is pulled up, and the magnetic operational reaction force F reaches −F1 (lower maximum value) when the stroke amount ST becomes −D1.

In the example illustrated in FIG. 18, the control unit CTR changes the magnitude of the current flowing through the coil 4 in the second energizing direction according to the output of the position sensor 51, as illustrated by the characteristic line of the dash-dotted line in the lower figure of FIG. 18. Specifically, the control unit CTR derives the stroke amount ST of the movable member MB based on the output of the position sensor 51, and changes the magnitude of the current according to the change in the stroke amount ST. More specifically, the control unit CTR linearly reduces the magnitude of the current flowing through the coil 4 in the second energizing direction to 0 while the stroke amount ST changes from +db through 0 to −D1.

The characteristic line of the dash-dotted line in the upper figure of FIG. 18 indicates that, as in the case the current is not supplied to the coil 4, the magnetic operational reaction force F decreases substantially linearly as the stroke amount ST when the movable member MB is pulled up further increases beyond −D1, and the magnetic operational reaction force F becomes −F2 (lower end value) when the stroke amount ST becomes −D2. When the stroke amount ST is between −D1 and −D2, the characteristic line of the dash-dotted line in the upper figure of FIG. 18 completely coincides with the characteristic line of the solid characteristic line in the upper figure of FIG. 16. When the stroke amount ST is between −D1 and −D2, the control unit CTR maintains the magnitude of the current flowing through the coil 4 at 0.

Thus, by controlling the magnitude of the current flowing through the coil 4 in the second energizing direction, the control unit CTR can realize the relationship between the magnetic operational reaction force F and the stroke amount ST, represented by the characteristic line of the dash-dotted line in the upper figure of FIG. 18. That is, the control unit CTR can shift the reference position of the movable member MB downward (in the Z2 direction) while maintaining the upper maximum value, the lower maximum value, the upper end value, and the lower end value of the characteristic line (the dotted characteristic line in the upper figure of FIG. 18) when the current is not supplied to the coil 4.

Figure 19:
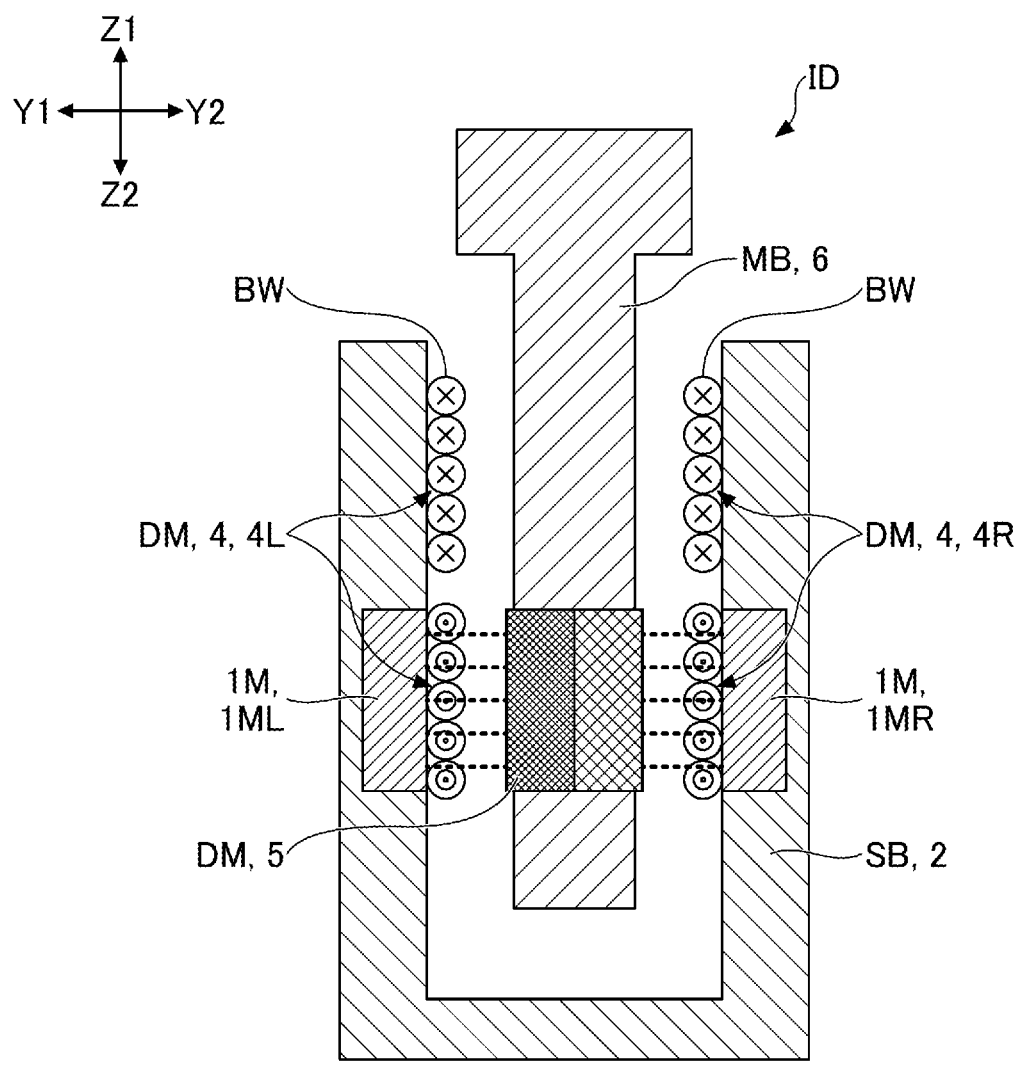
FIG. 19 is a schematic cross-sectional view of the input device.

As described above, the input device ID according to the embodiment of the present invention is an input device capable of imparting a magnetic operational reaction force, and includes, for example, as illustrated in FIG. 19 (schematic cross-sectional view of the input device ID), a stationary member SB (cylindrical body 2), a magnetic member 1M fixed to the stationary member SB (cylindrical body 2), a movable member MB (magnet holder 6) at least partially housed in the stationary member SB (cylindrical body 2) to which the magnetic member 1M is fixed, a magnet 5 fixed to the movable member MB (magnet holder 6), and a driving means DM constituted by a coil 4 fixed to the stationary member SB (cylindrical body 2) and moving the movable member MB (magnet holder 6) in a first direction (Z-axis direction) relative to the stationary member SB (cylindrical body 2). The magnet 5 is magnetized along a second direction (Y-axis direction) perpendicular to the first direction (Z-axis direction). In the example illustrated in FIG. 19, the left side (Y1 side) of the magnet 5 is magnetized to the S-pole, and the right side (Y2 side) of the magnet 5 is magnetized to the N-pole. The coil 4 has the bundle of turns BW of a conductive wire extending along a third direction (X-axis direction) perpendicular to both the first direction (Z-axis direction) and the second direction (Y-axis direction), the bundle of turns being juxtaposed along the first direction (Z-axis direction). The magnetic member 1M is positioned so as to generate an attraction force between the magnet 5 and the magnetic member 1M which acts to bring the movable member MB closer to a predetermined position from a position deviated from the predetermined position. In the example illustrated in FIG. 19, the movable member MB is in the predetermined position, and a part of the magnetic field line representing the magnetic field generating the attraction force is represented by a dotted line.

Specifically, as illustrated in FIG. 5, the input device ID capable of imparting the magnetic operational reaction force includes, for example, the stationary member (housing HS), the magnetic member 1M fixed to the stationary member (housing HS), the movable member MB at least partially housed in the stationary member (housing HS) to which the magnetic member 1M is fixed, and the driving means DM for moving the movable member MB in the first direction (Z-axis direction) relative to the stationary member (housing HS). The driving means DM is constituted of the magnet fixed to the movable member MB and the coil 4 fixed to the stationary member (housing HS). The magnet 5 is magnetized along the second direction (Y-axis direction) perpendicular to the first direction (Z-axis direction). The coil 4 has the bundle of turns formed by a conductive wire extending along the third direction (X-axis direction) perpendicular to each of the first direction (Z-axis direction) and the second direction (Y-axis direction) and being juxtaposed along the first direction (Z-axis direction). For example, as illustrated in FIGS. 13A and 13B, the bundles of turns include an upper bundle of turns 4R1U, a lower bundle of turns 4R1D, an upper bundle of turns 4R2U, a lower bundle of turns 4R2D, an upper bundle of turns 4R3U, a lower bundle of turns 4R3D, an upper bundle of turns 4L1U, a lower bundle of turns 4L1D, an upper bundle of turns 4L2U, a lower bundle of turns 4L2D, an upper bundle of turns 4L3U, and a lower bundle of turns 4L3D. As illustrated in FIG. 14, the magnetic member 1M is disposed at a position where the magnet 5 and the magnetic member 1M generate an attraction force acting to bring the movable member MB closer to a predetermined position from a position deviated from the predetermined position. The predetermined position is, for example, a reference position.

This configuration has the effect that a magnetic operational reaction force can be generated even when a current is not supplied to the driving means DM. Specifically, this configuration has the effect that a magnetic operational reaction force can be generated even when the coil 4 is not energized.

Typically, the first direction (Z-axis direction) is an up-and-down direction, the second direction (Y-axis direction) is a left-and-right direction, and the third direction (X-axis direction) is a front-and-back direction. In this case, the magnetic member 1M may be configured such that when the movable member MB is displaced downward (Z2-direction), the lower end of the magnetic member 1M is positioned above the lower end of the magnet 5.

By utilizing the magnetic attraction force acting between the magnetic member 1M and the magnet 5, an upward magnetic operational reaction force can be generated when the movable member MB is manually pushed downward by an operator even when the coil 4 is not energized.

The stationary member (housing HS) may have a stopper portion that contacts the movable member MB when the movable member MB is displaced downward (in the Z2 direction) by a predetermined distance. In this case, the stopper portion may be provided at a position where the movable member MB comes into contact after the magnetic operational reaction force F, which increases as the movable member MB is displaced downward (in the Z2 direction), exceeds a maximum value and begins to decrease. For example, the cylindrical body 2 constituting the housing HS may have a fourth plate portion 2A4 (see FIG. 5), which comes into contact with the magnet holder 6 when the movable member MB (magnet holder 6) is displaced downward (in the Z2 direction) by +D2, as the stopper portion. In this case, the fourth plate portion 2A4 may be provided at a position where the magnet holder 6 comes into contact after the magnetic operational reaction force F (see FIG. 16), which increases as the magnet holder 6 is displaced downward (in the Z2 direction), passes +F1 (maximum value) and begins to decrease.

This configuration has the effect that when the displacement (stroke amount ST) of the movable member MB increases, an operator can feel a click by reversing from an increase to a decrease of the magnetic operational reaction force F. Therefore, this configuration has the effect that the operator can feel a click even without a spring member such as a dome-shaped rubber contact or a metal contact for reversing from an increase to a decrease of the magnetic operational reaction force. As a result, this configuration can extend the life of the input device ID capable of imparting a click feeling in that no spring member is required.

When operating force is not applied to the movable member MB and a current is not supplied to the coil 4, the movable member MB (magnet 5) may be positioned at the first reference position (positions illustrated in the upper figure of FIG. 14 and the upper figure of FIG. 15). In this case, the driving means DM may be able to set a mode in which the position of the movable member MB when the operating force is not applied to the movable member MB is at a reference position different from the first reference position by applying current to the coil 4. For example, the driving means DM may shift the reference position of the movable member MB downward by flowing a current of a predetermined size in the first energizing direction to the coil 4. That is, the driving means DM may shift the reference position of the movable member MB (magnet 5) from the first reference position to the second reference position (a position lower than the first reference position). Further, the driving means DM may shift the reference position of the movable member MB upward by applying a current of a predetermined size in the second energizing direction (the reverse direction of the first energizing direction) to the coil 4. That is, the driving means DM may shift the reference position of the movable member MB (magnet 5) from the first reference position to the third reference position (a position above the first reference position). The driving means DM may be configured to switch the operation mode of the movable member MB between the reference mode, the first mode, and the second mode by switching the direction of the current flowing through the coil 4. The reference mode is an operation mode in which the reference position of the movable member MB becomes the first reference position when an operation force is not applied to the movable member MB. The first mode is an operation mode in which the reference position of the movable member MB is lower (Z2 side) than the first reference position when an operation force is not applied to the movable member MB. The second mode is an operation mode in which the reference position of the movable member MB is higher (Z1 side) than the first reference position when an operation force is not applied to the movable member MB.

Specifically, the first mode is, for example, the operation mode represented by the characteristic line of the dash-dotted line in the upper figure of FIG. 17, and is also referred to as the "short stroke mode" which means that the stroke amount ST in the depressing direction is shorter (the movable range of the movable member MB is smaller) than in the case of the reference mode. The second mode is, for example, the operation mode represented by the characteristic line of the solid characteristic line in the upper figure of FIG. 17, and is also referred to as the "long stroke mode" which means that the stroke amount ST in the depressing direction is longer (the movable range of the movable member MB is larger) than in the case of the reference mode.

This configuration has the effect that the reference position of the movable member MB can be arbitrarily set by applying current to the coil 4. Further, this configuration has the effect that the stroke amount ST (the size of the movable range of the movable member MB) of the movable member MB in the depressing direction or the pulling direction can be arbitrarily adjusted by changing the direction and magnitude of the current flowing through the coil 4. This configuration also has the effect of adjusting the magnitude of the operating force required to push down or pull up the movable member MB.

As illustrated in the middle figure of FIG. 14, the magnetic member 1M may be arranged so that the lower end (end on the Z2 side) of the magnetic member 1M is positioned above (Z1 side) the lower end (end on the Z2 side) of the magnet 5 when the movable member MB is at lower end (end on the Z2 side) of the movable range.

This arrangement has the effect that when the movable member MB is located on the lower end (end on the Z2 side) of the movable range, a magnetic force can be generated to move the movable member MB toward the center of the movable range.

The magnetic member 1M may be arranged so that the lower end (end on the Z2 side) of the magnetic member 1M is positioned above (Z1 side) the lower end (end on the Z2 side) of the magnet 5 when the movable member MB is located on the reference position.

This arrangement has the effect that a magnetic force can be generated to move the movable member MB toward the center of the movable range even when the movable member MB is located close to the center of the movable range.

As illustrated in the upper figure of FIG. 14, the coil 4 may include a left coil 4L disposed to the left (Y1 direction) of the movable member MB (magnet 5) and a right coil 4R disposed to the right (Y2 direction) of the movable member MB (magnet 5). In this case, the magnetic member 1M may include a left magnetic member 1ML disposed to the left (Y1 direction) of the movable member MB (magnet 5) and a right magnetic member 1MR disposed to the right (Y2 direction) of the movable member MB (magnet 5). This configuration has the effect that the driving force based on Lorentz force generated by the driving means DM (coil 4 and magnet 5) can be increased compared with the configuration in which the coil 4 is disposed only to either the left (Y1 direction) or the right (Y2 direction) of the movable member MB. This configuration also has the effect that the space efficiency in the housing HS can be increased compared with the configuration in which the coil 4 is disposed only to either the left (Y1 direction) or the right (Y2 direction) of the movable member MB.

As illustrated in FIG. 2, the input device ID may include the position sensor 51 as a detection means (a detection device) for detecting the position of the movable member MB. In this case, the driving means DM may be configured to control the current supplied to the coil 4 based on the position of the movable member MB detected by the position sensor 51. This configuration has the effect that the magnetic operational reaction force F along an arbitrary characteristic line (the relationship between the magnetic operational reaction force F and the stroke amount ST) can be realized by changing the direction and magnitude of the current flowing through the coil 4 in response to the output of the position sensor 51.

A preferred embodiment of the present invention has been described in detail. However, the present invention is not limited to the embodiments described above. The embodiments described above may be subject to various modifications, substitutions, and the like, without departing from the scope of the present invention. In addition, each of the features described with reference to the embodiments described above may be combined as appropriate, provided that they are not technically inconsistent.

For example, in the embodiments described above, the linear motion device 101 is configured such that the magnetic operational reaction force F has a maximum value (at least one of the upper maximum value and the lower maximum value). For example, in the example illustrated in FIG. 16, the linear motion device 101 is configured such that the magnetic operational reaction force F becomes the upper maximum value when the stroke amount ST is +D1, and then the magnetic operational reaction force F decreases as the stroke amount ST increases to +D2. However, the linear motion device 101 may be configured such that the magnetic operational reaction force F does not have the maximum value. Specifically, the linear motion device 101 may be configured such that the magnetic operational reaction force F continues to increase until the stroke amount ST goes from 0 to +D2, that is, until the stroke amount ST goes from +D2 and the movement of the movable member MB is stopped by the stopper portion.

The invention claimed is:

1. An input device which is capable of imparting a magnetic operational reaction force, comprising:
   a stationary member;
   a magnetic member fixed to the stationary member;
   a movable member at least partially housed in the stationary member to which the magnetic member is fixed; and
   a driving device including a magnet fixed to the movable member and coils fixed to the stationary member, configured to move the movable member in a first direction relative to the stationary member,
   wherein the magnet is magnetized along a second direction perpendicular to the first direction, wherein the coils have bundles of turns constituted by conductive wires, and the conductive wires in the bundles of turns extend along a third direction perpendicular to each of the first direction and the second direction, and the conducting wires are juxtaposed along the first direction, wherein the magnetic member is positioned so as to generate an attraction force between the magnet and the magnetic member which acts to bring the movable member closer to a predetermined position from a position deviated from the predetermined position, wherein the first direction is an up-and-down direction, wherein the second direction is a left-and-right direction, wherein the third direction is a front-and-back direction, wherein a lower end of the magnetic member is positioned above a lower end of the magnet when the movable member is displaced downward, wherein the stationary member has a stopper portion that contacts the movable member when the movable member is displaced downward by a predetermined distance, and wherein the stopper portion is provided at a position contacted by the movable member after the magnetic operational reaction force, which increases as the movable member is displaced downward, has exceeded a maximum value and has started to decrease.

2. The input device according to claim 1, wherein the lower end of the magnetic member is positioned above the lower end of the magnet when the movable member is positioned in a reference position.

3. The input device according to claim 1, wherein the coils include a left coil disposed to the left of the movable member and a right coil disposed to the right of the movable member, and wherein the magnetic member includes a left magnetic member disposed to the left of the movable member and a right magnetic member disposed to the right of the movable member.

4. The input device according to claim 1, further comprising a detection device configured to detect a position of the movable member, wherein the driving device controls the current supplied to the coils based on the position of the movable member detected by the detection device.

5. The input device according to claim 1, wherein when an operating force is not applied to the movable member and a current is not supplied to the coils, the movable member is positioned in a first reference position, and wherein the driving device can set a mode in which a position of the movable member is at a reference position different from the first reference position when the operating force is not applied to the movable member by applying a current to the coils.

6. The input device according to claim 5, wherein the driving device is configured to switch an operation mode of the movable member between a first mode in which a position of the movable member when the operation force is not applied to the movable member is a second reference position that is lower than the first reference position and a second mode in which a position of the movable member when the operating force is not applied to the movable member is a third reference position that is higher than the first reference position, by switching a direction of the current flowing through the coils.

* * * * *